(12) United States Patent
Perlman

(10) Patent No.: US 7,471,665 B2
(45) Date of Patent: Dec. 30, 2008

(54) SINGLE TRANSCEIVER ARCHITECTURE FOR A WIRELESS NETWORK

(75) Inventor: Stephen G. Perlman, Palo Alto, CA (US)

(73) Assignee: OnLive, Inc., Palo Alto, CA (US)

( * ) Notice: Subject to any disclaimer, the term of this patent is extended or adjusted under 35 U.S.C. 154(b) by 18 days.

(21) Appl. No.: 11/800,543

(22) Filed: May 5, 2007

(65) Prior Publication Data

US 2008/0019341 A1 Jan. 24, 2008

Related U.S. Application Data

(63) Continuation of application No. 10/435,005, filed on May 9, 2003, now Pat. No. 7,215,660, which is a continuation-in-part of application No. 10/407,445, filed on Apr. 4, 2003, which is a continuation-in-part of application No. 10/367,197, filed on Feb. 14, 2003.

(51) Int. Cl.
 *H04Q 7/24* (2006.01)
(52) U.S. Cl. .................. 370/338; 370/315; 370/318; 455/3.01; 455/3.05; 455/3.06; 455/11.1
(58) Field of Classification Search .......... 370/315, 370/318, 338; 455/3.01, 3.05, 3.06, 11.1
See application file for complete search history.

(56) References Cited

U.S. PATENT DOCUMENTS

| 4,539,706 A | 9/1985 | Mears et al. |
| 5,058,199 A | 10/1991 | Grube |
| 5,129,096 A | 7/1992 | Burns |
| 5,222,246 A | 6/1993 | Wolkstein |
| 5,408,679 A * | 4/1995 | Masuda ............... 455/11.1 |
| 5,509,028 A | 4/1996 | Marque-Pucheu |

(Continued)

FOREIGN PATENT DOCUMENTS

EP 1 094 642 A2 4/2001

(Continued)

OTHER PUBLICATIONS

Jack Boulware, "Power Houses", Wired Nov. 2002, Issue 10.11, (electronic copy, 11 pages), Wired Digital, Inc., US.

(Continued)

*Primary Examiner*—Stephen M D'Agosta
(74) *Attorney, Agent, or Firm*—The Law Offices of Bradley J. Bereznak

(57) ABSTRACT

A network for wireless transmission of data includes a source access point, a destination device and a plurality of wireless repeaters that provide a transmission link between the source access point and the destination device. The plurality of access points each includes a single transceiver with separate transmitter and receiver sections operable to simultaneously transmit and receive data on different frequency channels. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

11 Claims, 36 Drawing Sheets

U.S. PATENT DOCUMENTS

| | | | |
|---|---|---|---|
| 5,574,979 A * | 11/1996 | West | 455/63.1 |
| 5,608,412 A | 3/1997 | Welles, II | |
| 5,640,386 A | 6/1997 | Wiedeman | |
| 5,654,747 A | 8/1997 | Ottesen et al. | |
| 5,732,076 A * | 3/1998 | Ketseoglou et al. | 370/347 |
| 5,742,680 A | 4/1998 | Wilson | |
| 5,815,146 A | 9/1998 | Youden et al. | |
| 5,870,665 A | 2/1999 | Uchikawa | |
| 5,890,055 A | 3/1999 | Chu et al. | |
| 5,915,020 A | 6/1999 | Tilford et al. | |
| 5,959,592 A | 9/1999 | Petruzzelli | |
| 6,009,060 A | 12/1999 | Kim | |
| 6,092,117 A | 7/2000 | Gladwin et al. | |
| 6,132,306 A | 10/2000 | Trompower | |
| 6,148,142 A | 11/2000 | Anderson | |
| 6,160,993 A | 12/2000 | Wilson | |
| 6,166,703 A | 12/2000 | Muterspaugh | |
| 6,188,571 B1 | 2/2001 | Roganti et al. | |
| 6,205,185 B1 | 3/2001 | Kajiwara | |
| 6,263,503 B1 | 7/2001 | Margulis | |
| 6,323,909 B1 | 11/2001 | Michener et al. | |
| 6,347,216 B1 | 2/2002 | Marko | |
| 6,397,038 B1 | 5/2002 | Green, Sr. et al. | |
| 6,404,775 B1 | 6/2002 | Leslie et al. | |
| 6,412,112 B1 | 6/2002 | Barrett et al. | |
| 6,424,817 B1 | 7/2002 | Hadden et al. | |
| 6,430,233 B1 | 8/2002 | Dillon et al. | |
| 6,473,858 B1 | 10/2002 | Shimomura et al. | |
| 6,584,080 B1 | 6/2003 | Ganz et al. | |
| 6,597,891 B2 | 7/2003 | Tantawy et al. | |
| 6,600,730 B1 | 7/2003 | Davis et al. | |
| 6,614,768 B1 | 9/2003 | Mahany et al. | |
| 6,650,869 B2 | 11/2003 | Kelly et al. | |
| 6,671,186 B2 | 12/2003 | Kopf | |
| 6,684,058 B1 | 1/2004 | Karacaoglu et al. | |
| 6,690,657 B1 * | 2/2004 | Lau et al. | 370/315 |
| 6,690,926 B2 | 2/2004 | Tawil et al. | |
| 6,728,541 B2 | 4/2004 | Ohkura et al. | |
| 6,741,841 B1 | 5/2004 | Mitchell | |
| 6,745,050 B1 | 6/2004 | Forsythe et al. | |
| 6,757,913 B2 | 6/2004 | Knox | |
| 6,788,882 B1 | 9/2004 | Geer et al. | |
| 6,811,113 B1 | 11/2004 | Silansky et al. | |
| 6,832,071 B1 | 12/2004 | Nakamura et al. | |
| 6,836,658 B1 | 12/2004 | Sharon et al. | |
| 6,842,617 B2 | 1/2005 | Williams | |
| 6,845,090 B1 | 1/2005 | Takabatake et al. | |
| 6,847,625 B2 | 1/2005 | Heinonen et al. | |
| 6,850,285 B2 | 2/2005 | Eaton et al. | |
| 6,853,197 B1 | 2/2005 | McFarland et al. | |
| 6,856,786 B2 | 2/2005 | Belostotsky et al. | |
| 6,886,029 B1 | 4/2005 | Pecus et al. | |
| 6,925,285 B2 | 8/2005 | Kim | |
| 6,968,153 B1 | 11/2005 | Heinonen et al. | |
| 7,072,627 B2 | 7/2006 | Coffin, III | |
| 7,215,660 B2 | 5/2007 | Perlman | |
| 7,289,478 B1 | 10/2007 | Kim et al. | |
| 2002/0028655 A1 | 3/2002 | Rosener et al. | |
| 2002/0038459 A1 | 3/2002 | Talmola et al. | |
| 2002/0046285 A1 | 4/2002 | Yasushi et al. | |
| 2002/0059614 A1 | 5/2002 | Lipsanen et al. | |
| 2002/0061743 A1 | 5/2002 | Hutcheson et al. | |
| 2002/0068592 A1 | 6/2002 | Hutcheson et al. | |
| 2002/0071658 A1 | 6/2002 | Marko et al. | |
| 2002/0072329 A1 | 6/2002 | Bandeira et al. | |
| 2002/0106119 A1 | 8/2002 | Foran et al. | |
| 2002/0115409 A1 | 8/2002 | Khayarallah | |
| 2002/0152303 A1 | 10/2002 | Dispensa | |
| 2002/0154055 A1 | 10/2002 | Davis | |
| 2002/0181189 A1 | 12/2002 | Yang et al. | |
| 2002/0188955 A1 | 12/2002 | Thompson et al. | |
| 2003/0054827 A1 | 3/2003 | Schmidt et al. | |
| 2003/0079016 A1 | 4/2003 | Tsao et al. | |
| 2003/0124977 A1 | 7/2003 | Smith et al. | |
| 2003/0139150 A1 | 7/2003 | Rodriguez et al. | |
| 2003/0181162 A1 | 9/2003 | Matula | |
| 2003/0181229 A1 | 9/2003 | Forster et al. | |
| 2003/0199247 A1 | 10/2003 | Striemer | |
| 2003/0207684 A1 | 11/2003 | Wesel | |
| 2003/0216144 A1 | 11/2003 | Roese et al. | |
| 2003/0220072 A1 | 11/2003 | Coffin, III | |
| 2003/0231774 A1 | 12/2003 | Schildbach et al. | |
| 2003/0234804 A1 | 12/2003 | Parker et al. | |
| 2004/0034865 A1 | 2/2004 | Barrett et al. | |
| 2004/0094194 A1 | 5/2004 | Aldoretta et al. | |
| 2004/0110469 A1 | 6/2004 | Judd et al. | |
| 2004/0121648 A1 | 6/2004 | Voros | |
| 2004/0125820 A1 | 7/2004 | Rios | |
| 2004/0203694 A1 | 10/2004 | Wong et al. | |
| 2004/0204102 A1 | 10/2004 | Kuehnel et al. | |
| 2005/0286448 A1 | 12/2005 | Proctor | |
| 2006/0098592 A1 | 5/2006 | Proctor, Jr. et al. | |
| 2006/0183421 A1 | 8/2006 | Proctor et al. | |

FOREIGN PATENT DOCUMENTS

| | | |
|---|---|---|
| EP | 1202472 | 5/2002 |
| JP | 2001111575 | 4/2001 |
| JP | 2001244864 | 9/2001 |
| WO | PCT/US00/04840 | 8/2000 |
| WO | WO 02/078369 A1 | 10/2002 |
| WO | WO 03032666 | 4/2003 |

OTHER PUBLICATIONS

Thomas Bronez and James Marshall "Shipboard experiments for a multishop 802.11 communications system-RF channel characterization and MAC perfomance measurement" The Mitre Corporation McLean, VA.

* cited by examiner

1st Floor Repeater Topology

1st Floor Plan View

Side Elevation View

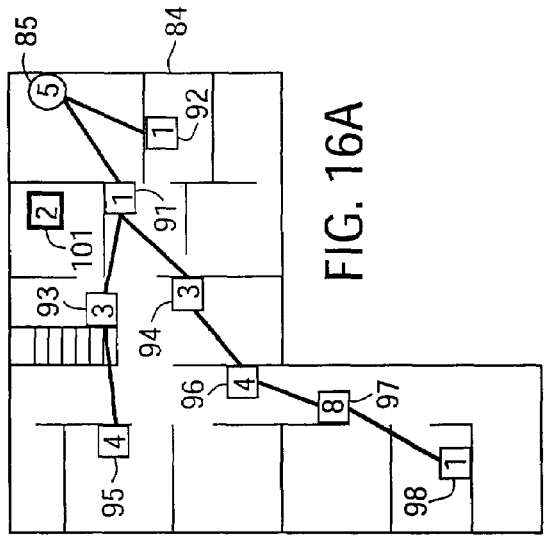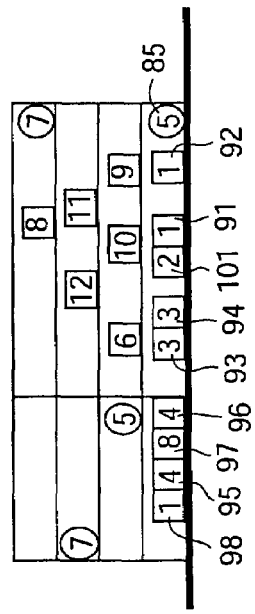
FIG. 16A
FIG. 16B
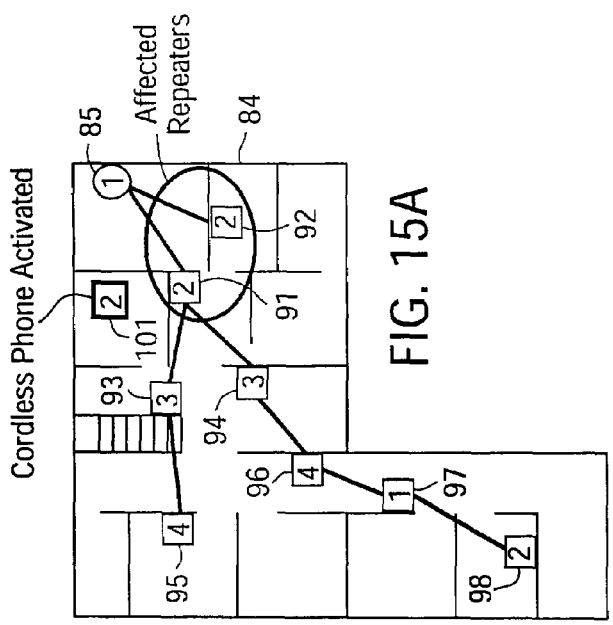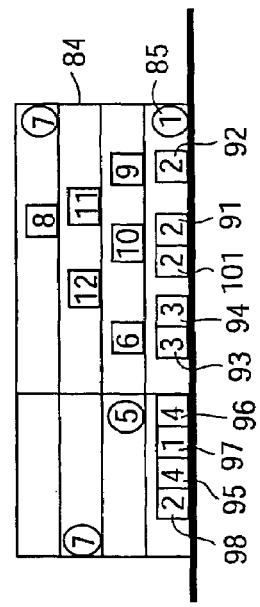
FIG. 15A
FIG. 15B

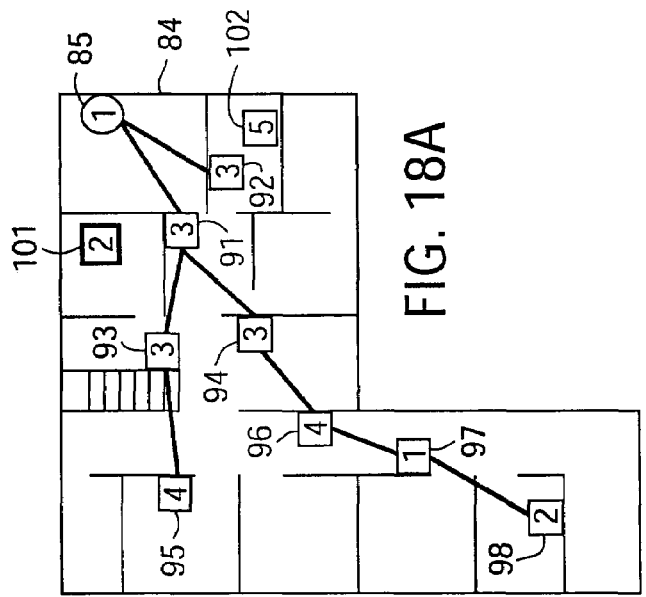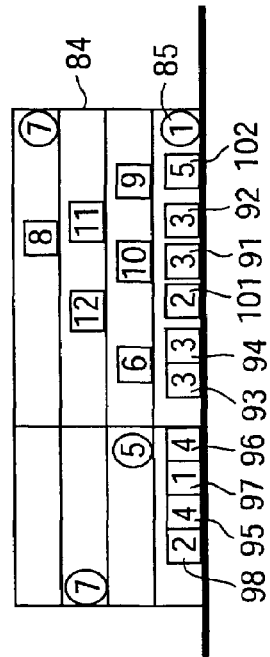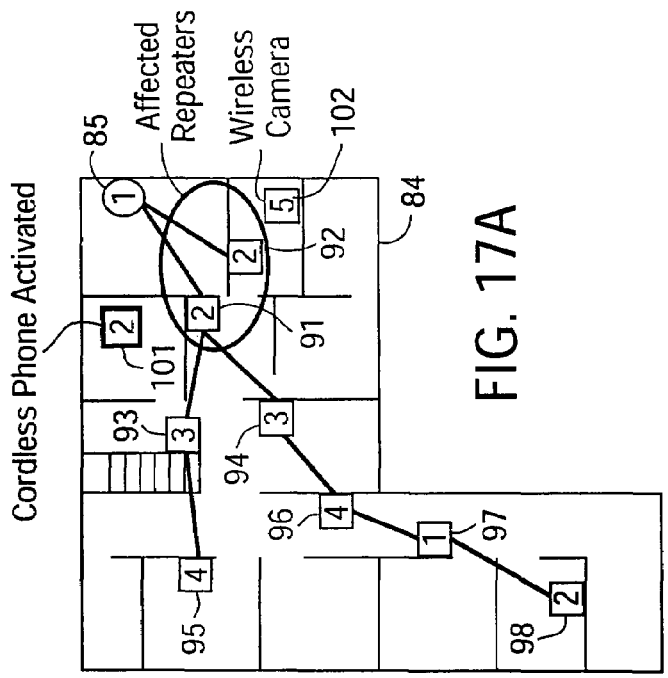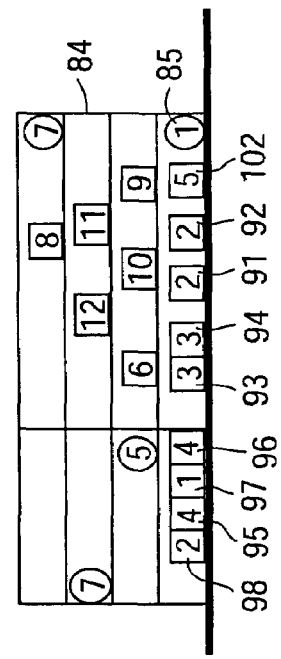
FIG. 17A
FIG. 17B
FIG. 18A
FIG. 18B

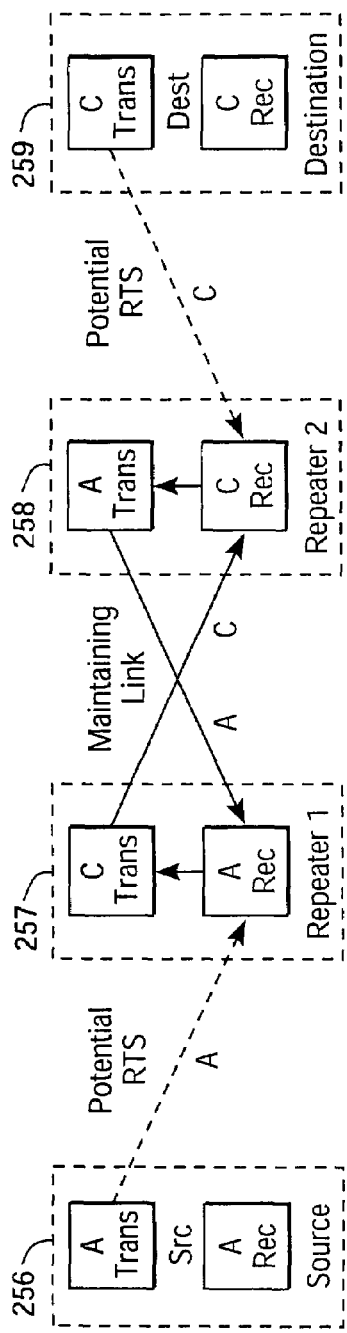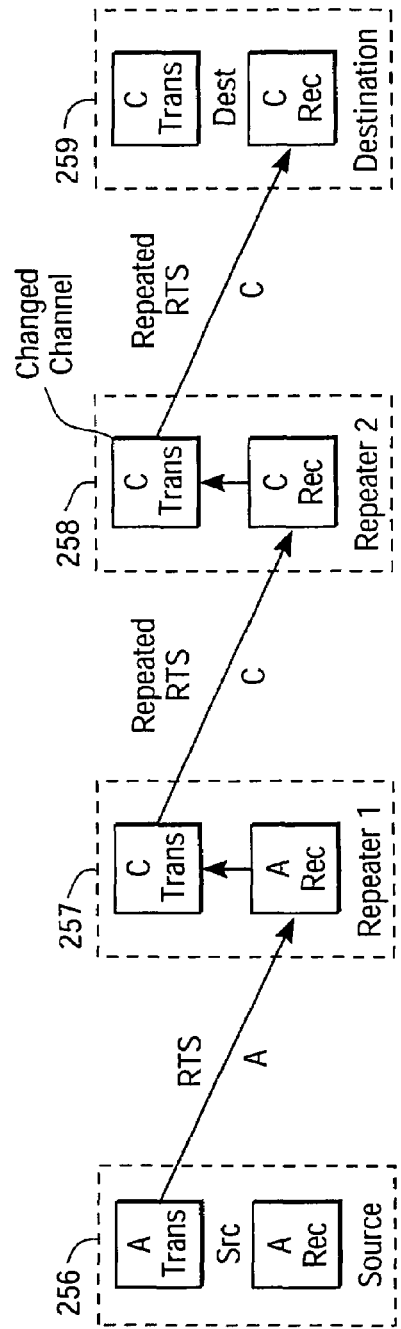
FIG. 29A
FIG. 29B

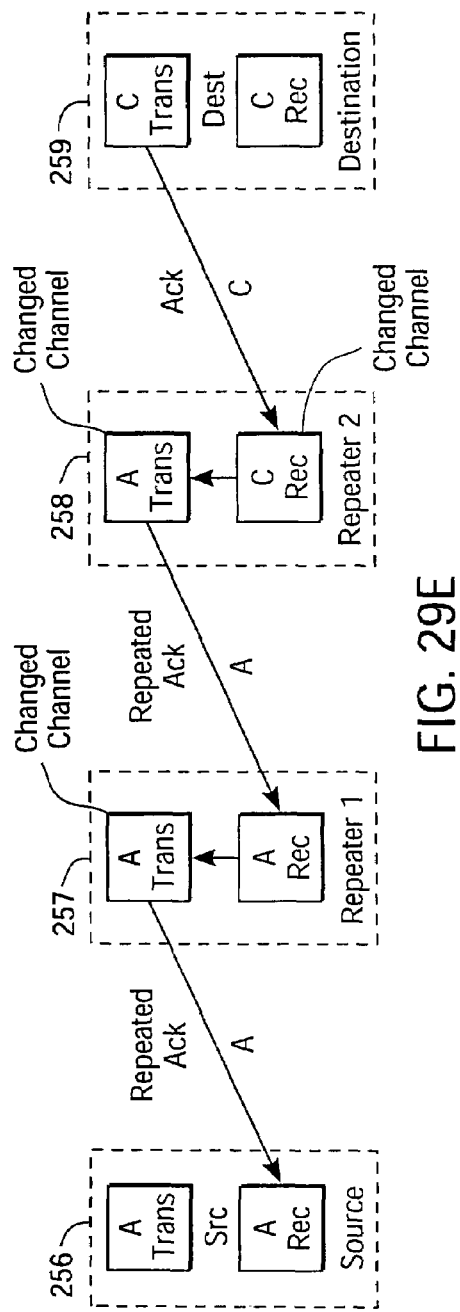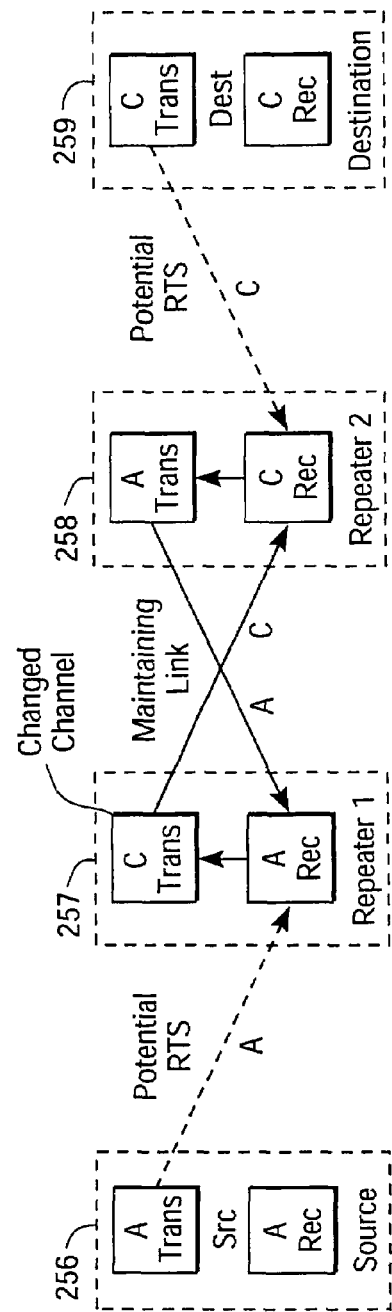

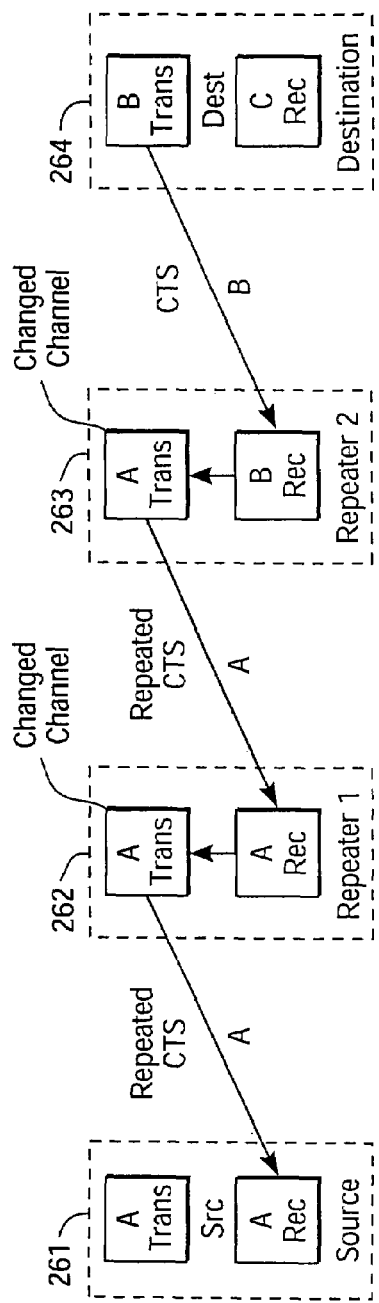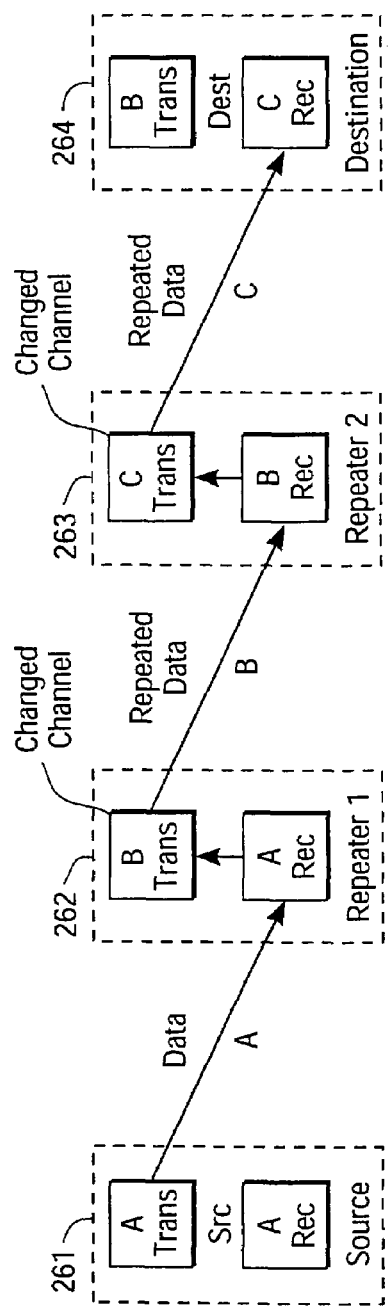
FIG. 30C
FIG. 30D

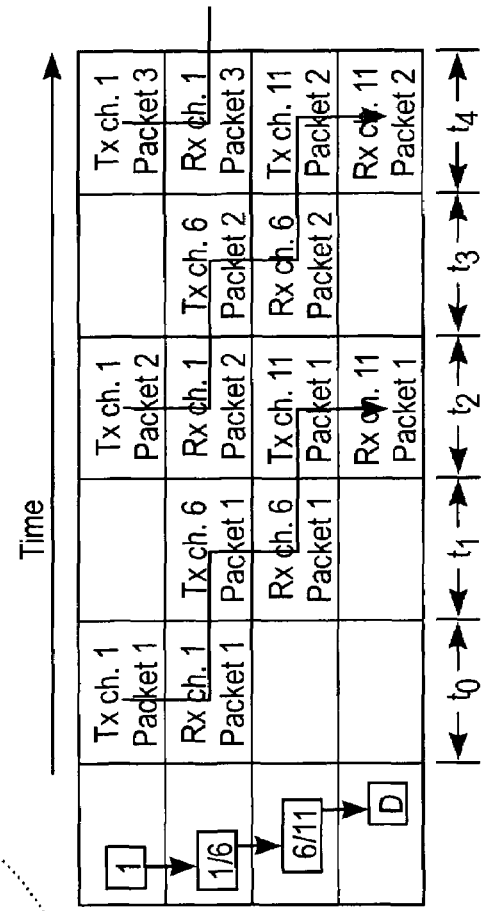
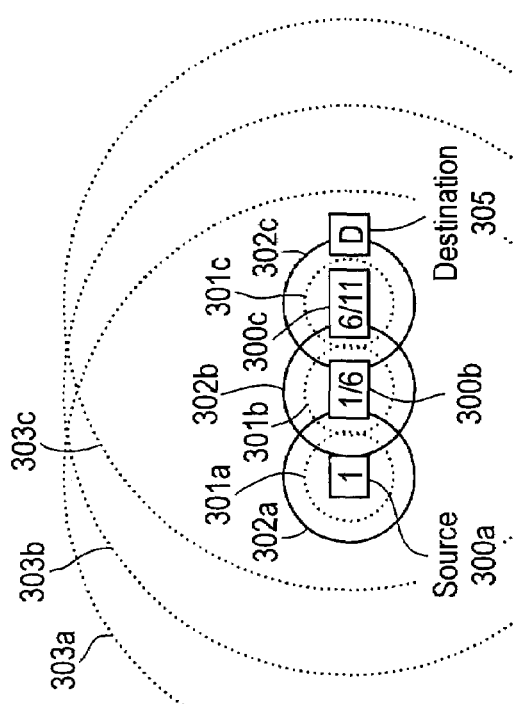
FIG. 33A
FIG. 33B

SINGLE TRANSCEIVER ARCHITECTURE FOR A WIRELESS NETWORK

RELATED APPLICATIONS

This application is a continuation of application Ser. No.: 10/435,005 filed May 9, 2003, now U.S. Pat. No. 7,215,660, which is a continuation-in-part application of Ser. No. 10/407,445 filed Apr. 4, 2003, which itself is a continuation-in-part of Ser. No. 10/367,197 filed Apr. 4, 2003, entitled, "SELF-CONFIGURING, ADAPTIVE, THREE-DIMENSIONAL, WIRELESS NETWORK", each of which are assigned to the assignee of the present application.

FIELD OF THE INVENTION

The present invention relates generally to wireless networks, and more particularly to methods and apparatus for configuring, expanding and maintaining a wireless network for home or office use.

BACKGROUND OF THE INVENTION

In recent years, wireless networks have emerged as flexible and cost-effective alternatives to conventional wired local area networks (LANs). At the office and in the home, people are gravitating toward use of laptops and handheld devices that they can carry with them while they do their jobs or move from the living room to the bedroom. This has led industry manufacturers to view wireless technologies as an attractive alternative to Ethernet-type LANs for home and office consumer electronics devices, such as laptop computers, Digital Versatile Disk ("DVD") players, television sets, and other media devices. Furthermore, because wireless networks obviate the need for physical wires, they can be installed relatively easily.

Wireless communication systems adapted for use in homes and office buildings typically include an access point coupled to an interactive data network (e.g., Internet) through a high-speed connection, such as a digital subscriber line (DSL) or cable modem. The access point is usually configured to have sufficient signal strength to transmit data to and receive data from remote terminals or client devices located throughout the building. For example, a portable computer in a house may include a PCMCIA card with a wireless transceiver that allows it to receive and transmit data via the access point. Data exchanged between wireless client devices and access points is generally sent in packet format. Data packets may carry information such as source address, destination address, synchronization bits, data, error correcting codes, etc.

A variety of wireless communication protocols for transmitting packets of information between wireless devices and access points have been adopted throughout the world. For example, in the United States, IEEE specification 802.11 and the Bluetooth wireless protocol have been widely used for industrial applications. IEEE specification 802.11, and Industrial, Scientific, and Medical (ISM) band networking protocols typically operate in the 2.4 GHz or 5 GHz frequency bands. In Europe, a standard known as HIPERLAN is widely used. The Wireless Asynchronous Transfer Mode (WATM) standard is another protocol under development. This latter standard defines the format of a transmission frame, within which control and data transfer functions can take place. The format and length of transmission frames may be fixed or dynamically variable.

Although traditional wireless networks work fairly well for residential Internet traffic running at data rates below 1 megabit per second (Mbps), transmission of high-bandwidth video programs is more problematic due to the much faster video data rates. High-bandwidth data transmissions can be degraded by the presence of structural obstacles (e.g., walls, floors, concrete, multiple stories, etc.), large appliances (e.g., refrigerator, oven, furnace, etc.), human traffic, conflicting devices (e.g., wireless phones, microwave ovens, neighboring networks, X10 cameras, etc.), as well as by the physical distance between the access point and the mobile terminal or other device. By way of example, an IEEE 802.11b compliant wireless transceiver may have a specified data rate of 11.0 megabits per second (Mbps), but the presence of walls in the transmission path can cause the effective data rate to drop to about 1.0 Mbps or less. Degradation of the video signal can also lead to repeated transmission re-tries, causing the video image to appear choppy. These practical limitations make present-day wireless technologies one of the most unreliable of all the networking options available for home media networks.

One proposed solution to this problem is to increase the number of access points in the home, with the various access points being interconnected by a high-speed cable wire. The drawback of this approach, however, is that it requires that cable wires be routed through the interior of the structure.

An alternative solution is to utilize wireless repeaters to extend coverage of the network throughout the building. For example, D-Link Systems, Inc., of Irvine, Calif. manufactures a 2.4 GHz wireless product that can be configured to perform either as a wireless access point, as a point-to-point bridge with another access point, as a point-to-multi-point wireless bridge, as a wireless client, or as a wireless repeater. As a wireless repeater, the product functions to re-transmit packets received from a primary access point. But the problem with these types of wireless repeaters is that they retransmit at the same frequency as the primary access point device. Consequently, because the primary access point and repeaters share the same channel, the bandwidth of the network is effectively reduced for each repeater installed. For example, if a data packet needs to be repeated (i.e., re-transmitted) three times in the same channel, each packet must wait until the previous packet has been repeated which means that the resulting bandwidth loss is 67%. So if the initial video transmission starts out at, say, 21 Mbps, the effective payload data rate at the receiver end is diminished to about 7 Mbps. Naturally, with more repeaters, more data hops are required, so the bandwidth loss becomes worse. This approach basically trades-off bandwidth for signal range—extending the range of the wireless network, but sacrificing valuable bandwidth in the process.

Still another attempted solution to the problem of wireless transmission of video data is to lower the bandwidth of the video through data compression. This technique involves compressing the video data prior to transmission, then decompressing the data after it has been received. The main drawback with compression/decompression techniques is that they tend to compromise the quality of the video image, which is unacceptable to most viewers. This approach also suffers from the problem of lost connections during transmission.

In view of the aforementioned shortcomings, there exists a strong need for a highly reliable wireless network (e.g., on a par with coaxial cable) that provides very high data rates (e.g., 30 Mbps) throughout the full coverage range of a home or building.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

FIGS. 15A & 15B show plan and side elevation views, respectively, of the wireless network of FIGS. 14A & 14B, but with a disturbance.

FIGS. 16A & 16B illustrate the network of FIGS. 15A and 15B after reconfiguration to overcome the disturbance.

FIGS. 17A & 17B illustrate another example of channel conflict in a wireless network implemented according to one embodiment of the present invention.

FIGS. 18A & 18B illustrate the network of FIGS. 17A and 17B after channel reconfiguration.

FIGS. 29A-29F illustrate an exemplary transaction across a wireless network utilizing non-access point repeaters in accordance with yet another embodiment of the present invention.

FIGS. 30A-30F illustrate an exemplary transaction across a wireless network utilizing access point repeaters in accordance with still another embodiment of the present invention.

FIG. 33A is an example of wireless signal repeating in accordance with another embodiment of the present invention.

FIG. 33B is a chart illustrating pipelined data packet flow from source to destination in accordance with the embodiment of FIG. 33A.

DETAILED DESCRIPTION

The present invention is a wireless local area network (WLAN) that utilizes cellular techniques to extend the range of transmission without degrading bandwidth. The wireless network of the present invention is thus ideally suited for transmitting video programs (e.g., digitally-encoded video broadcast services, pay-per-view television, on-demand video services, etc.) throughout a house or other building, thereby creating a "media-live" environment.

In the following description numerous specific details are set forth, such as frequencies, circuits, configurations, etc., in order to provide a thorough understanding of the present invention. However, persons having ordinary skill in the communication arts will appreciate that these specific details may not be needed to practice the present invention. It should also be understood that the basic architecture and concepts disclosed can be extended to a variety of different implementations and applications. Therefore, the following description should not be considered as limiting the scope of the invention.

Figure 1:
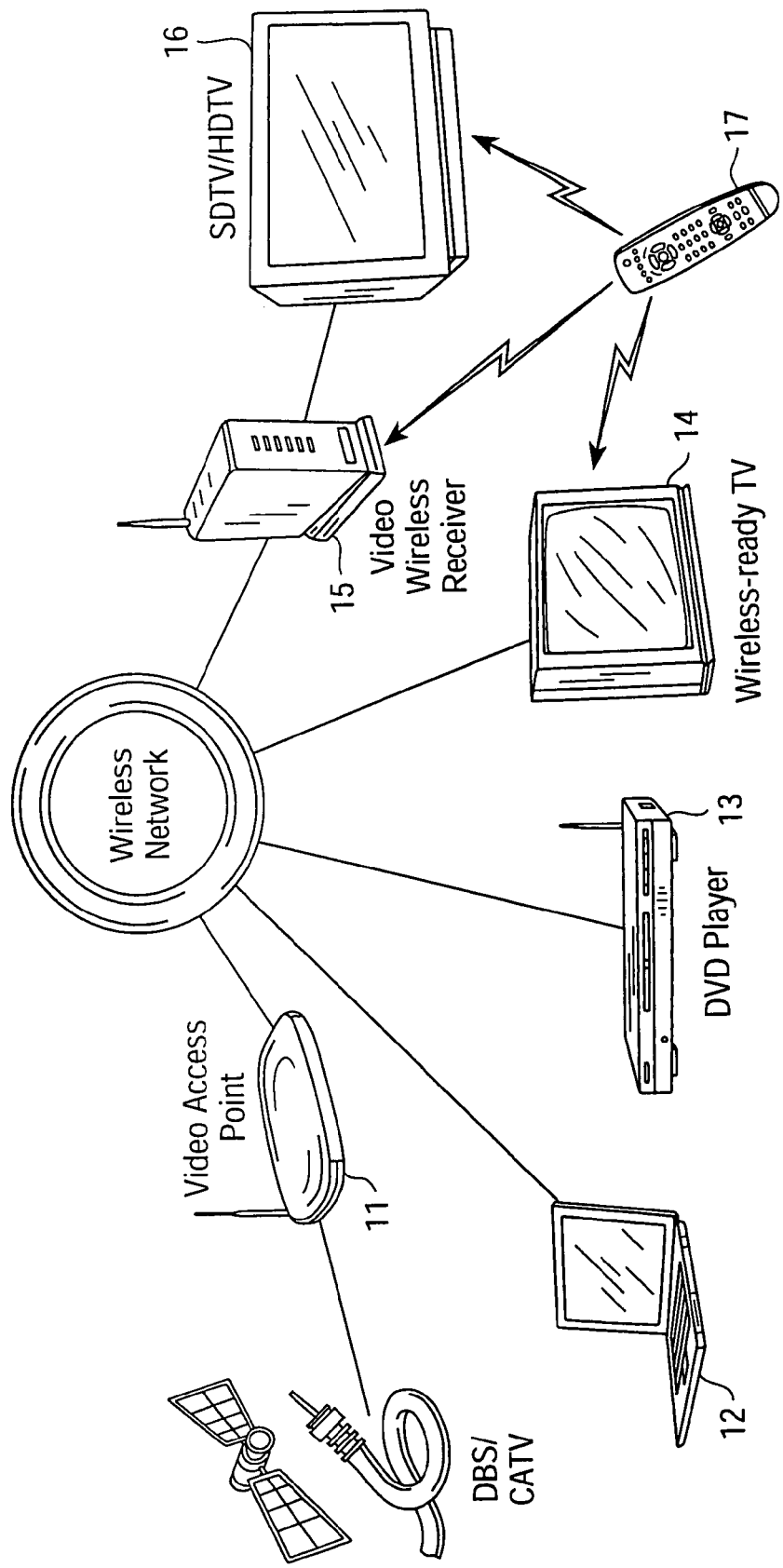
FIG. 1 is a conceptual diagram of a wireless network according to one embodiment of the present invention.

With reference to FIG. 1, a wireless home media network 10 according to one embodiment of the present invention comprises a source video access point 11 coupled to a broadband connection. By way of example, the broadband connection may provide video content from a Direct Broadcast Satellite (DBS) or digital cable service provider. Additional wireless access points (simply referred to as "access points" or "repeaters" in the context of the present application, unless specifically described otherwise) may be physically located in a distributed manner throughout the home or building to provide connectivity among a variety of home media devices configured for wireless communications. As shown in FIG. 1, these home media devices may include a laptop personal computer 12, DVD player 13, wireless-ready television 14, and wireless-linked receiver 15 coupled to either a standard definition or high-definition television (SDTV/HDTV) 16. Other types of devices, such as personal digital assistants (PDAs), may also be coupled to network 10 for receiving and/or transmitting data. Practitioners in the art will appreciate that many client media devices such as personal computers, televisions, PDAs, etc., have the capability of detecting the operating frequency of the access point within a particular micro-cellular transmission range.

Commands for one or more of these home media devices may be generated using a remote control unit 17, either through infrared (IR) or radio frequency (RF) signals. In one embodiment, wireless network 10 provides reliable, full home coverage at throughputs supporting multiple simultaneous video streams, e.g., two HDTV streams at approximately 30 Mbps; eight SDTV streams at about 16 Mbps.

According to the present invention a plurality of access points is utilized in a wireless network to provide relatively short transmission ranges that preserve bandwidth and achieve high reliability. The wireless network of the present invention implements a three-dimensional ("3-D") topology in which communications between an access point and mobile terminals or client media devices in a particular region occur at a frequency which is different than the communication frequency of a neighboring region. In specific embodiments, the 2.4 GHz and 5 GHz frequency bands are utilized for wireless transmissions. In the United States, for instance, the 2.4 GHz band provides three non-overlapping channels, whereas the 5 GHz band provides twelve non-overlapping channels for simultaneous transmission traffic. The wireless network of the present invention achieves full range coverage in the home without bandwidth loss by utilizing a different channel for each data packet hop. This feature allows repeater data packets to overlap in time, as discussed in more detail below.

Figure 2B:
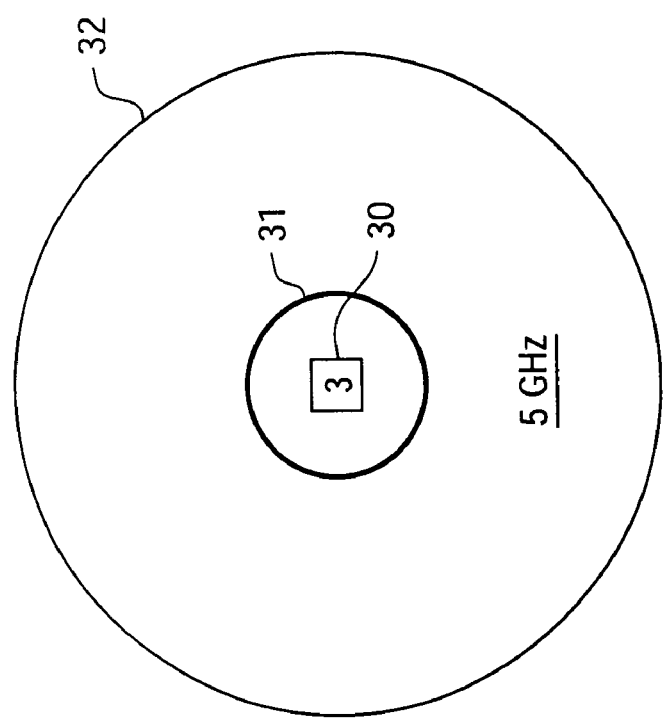
FIGS. 2A & 2B illustrate propagation characteristics for access points operating in the 2.4 GHz and 5 GHz frequency bands.
Figure 2A:
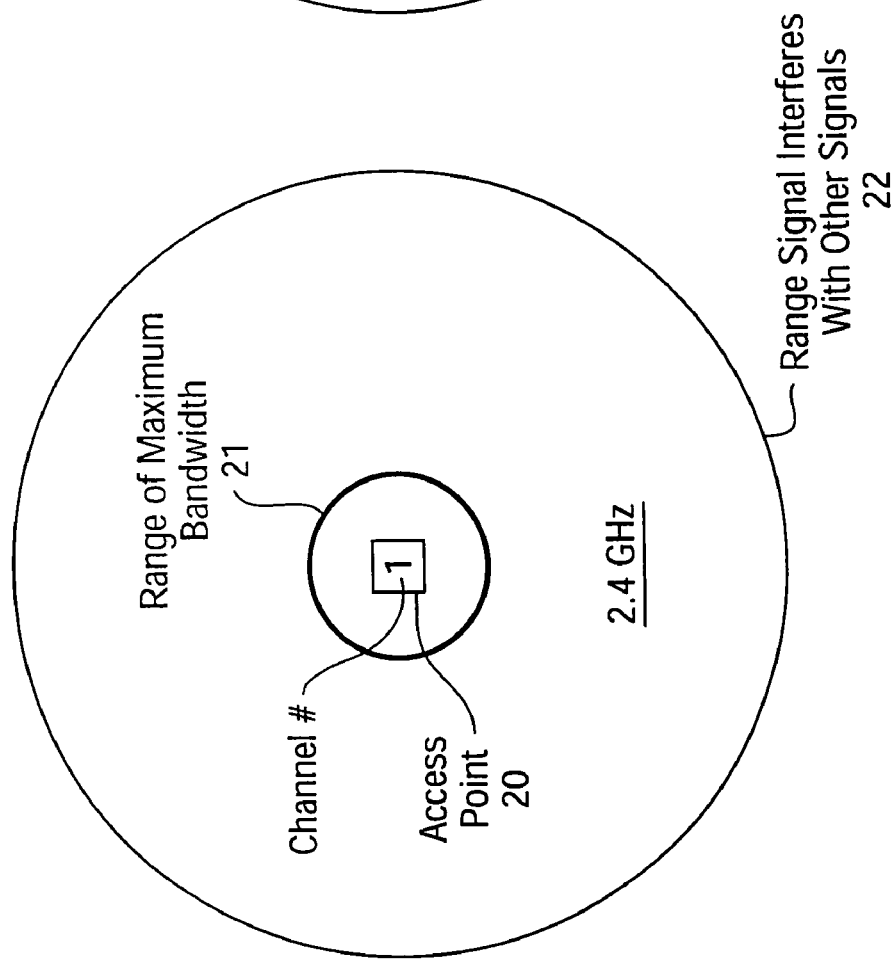

FIG. 2A is a diagram illustrating the two-dimensional propagation characteristics through open air associated with an access point 20 operating in the 2.4 GHz band and transmitting on a particular channel, i.e., channel 1. Inner circle 21 represents the range of maximum bandwidth, and outer circle 22 represents the range at which the signal from access point 20 ceases to interfere with other signals in the same channel. FIG. 2B shows an access point 30 operating in the 5 GHz band with maximum bandwidth and interference ranges represented by circles 31 and 32, respectively. As can be seen, both access points 20 and 30 have a relatively short range at maximum bandwidth, but have a fairly wide interfering signal range. Notably, access point 30 has a shorter interference range than access point 20.

Figure 3:
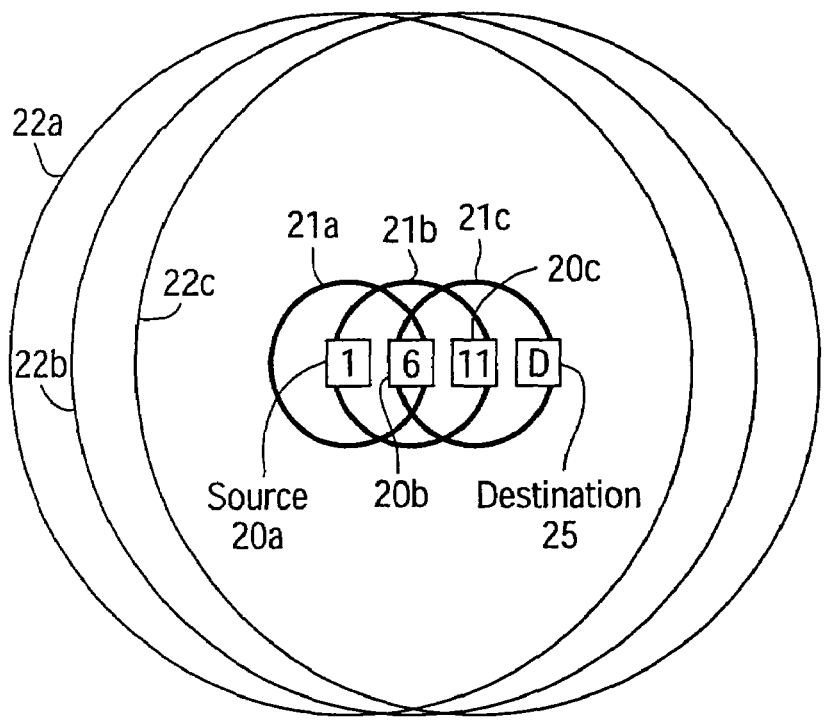
FIG. 3 is an example of wireless signal repeating in accordance with one embodiment of the present invention.

FIG. 3 is an example of wireless signal repeating in accordance with one embodiment of the present invention. In the embodiment of FIG. 3, each of the access points 20a-20c transmits on a different channel. For instance, access point 20a is shown operating on channel #1 in the 2.4 GHz band; access point 20b operates on channel #6; and access point 20c operates on channel #11 in the same band. The inner circles 21a-21c each denotes the ranges of maximum bandwidth associated with access points 20a-20c, respectively. (The outer circles 22a-22c denotes the same-channel interference signal range associated with access points 20a-20c, respectively.) As can be seen, each of the access points is advantageously located at a distance within the maximum bandwidth range of its nearest neighboring access point. Similarly, the destination media device 25 is disposed within the maximum bandwidth range of its nearest access point 20c.

In the example of FIG. 3, access points 20b and 20c function as signal repeaters to facilitate transmission of data from source access point 20a to destination device 25. To prevent loss of bandwidth during transmission, each of the access points 20a-20c repeats transmission of data packets on a different frequency channel than any of its neighboring access points within signal interference range. Access points located beyond the interference range of a channel may reuse that same channel. In this case, a source data packet 1 is transmitted by access point 20a on channel #1. Access point 20b repeats transmission of this data packet on channel #6. Access point 20c again repeats transmission of data packet 1; this time on channel #11. Destination media device 25 receives data packet 1 from access point 20c on channel #11.

Figure 4:
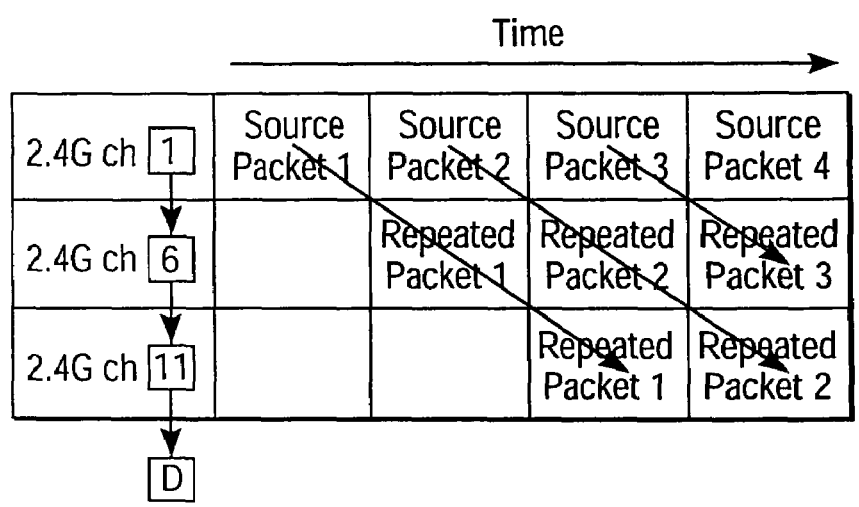
FIG. 4 is a chart illustrating pipelined data packet flow from source to destination in accordance with one embodiment of the present invention.

After the transmission of data packet 1, access point 20a may immediately transmit a second source data packet ("packet 2"), followed by a third source data packet, a fourth data packet, and so on. Each of these data packets are repeated across the network in a pipeline manner by access points 20b and 20c, as shown in FIG. 4. Pipelining of data packets across channels facilitates transmission of video data without loss of bandwidth. The wireless network of the present invention has no limitation on how far the transmission of data can extend, as long as there are a sufficient number of channels available.

In the 2.4 GHz band, three channels allows for three hops in any direction (including the initial transmission from the source) in three-dimensional space at maximum bandwidth. Since each hop normally can extend about 50 feet at maximum bandwidth, three hops on three different channels (one source plus two repeaters) can cover a distance of about 150 feet from source to destination. In the license-free 5 GHz band (e.g., 5725 MHz to 5850 MHz), there are currently twelve channels with upwards of 54 Mbps of bandwidth available on each channel in good transmission conditions. As with the 2.4 GHz band, each hop in the 5 GHz band will typically extend about 50 feet at maximum bandwidth, but the large number of channels permits hops to extend indefinitely. That is, in a wireless network operating in the 5 GHz band according to the present invention, repeaters extend far enough for channel reuse. This means that hops can extend the range of transmission from source to destination without limitation.

Figure 5:
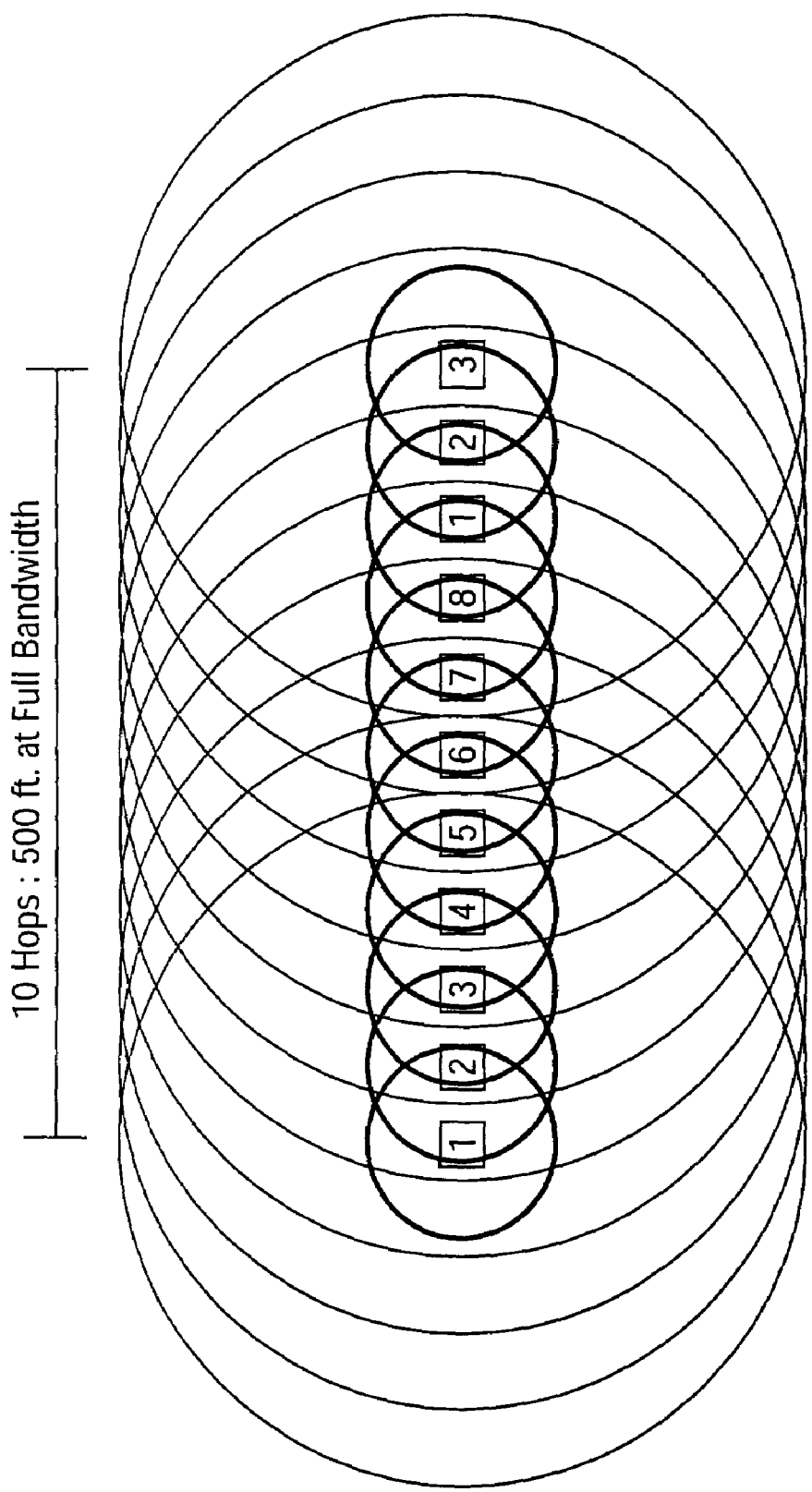
FIG. 5 is an example showing limitless data transmission range extension in accordance with another embodiment of the present invention.

FIG. 5 is an example showing a network configuration in which each hop extends about 50 feet, so that ten hops cover about 500 feet. In this example, after ten hops, any channel beyond its interference range may be reused. Note that the smaller inner circles representing the range of maximum bandwidth around the access points that operate on the same channel frequency (e.g., channel #1) are separated by a considerable distance (~400 feet). Note that each access point is shown spaced-apart from its nearest neighboring access point by a distance less than the maximum bandwidth range (i.e., small circle) of its nearest neighbor. At the same time, any two access points transmitting on the same channel are shown separated from each by a distance greater than the interference signal range. Access points that re-use the same channel are separated by a distance greater than their respective signal interference ranges. The large spatial separation between access points using the same frequency channel means that transmission problems due to channel interference between access points operating on the same channel are virtually nonexistent in the wireless network of the present invention.

Figure 6:
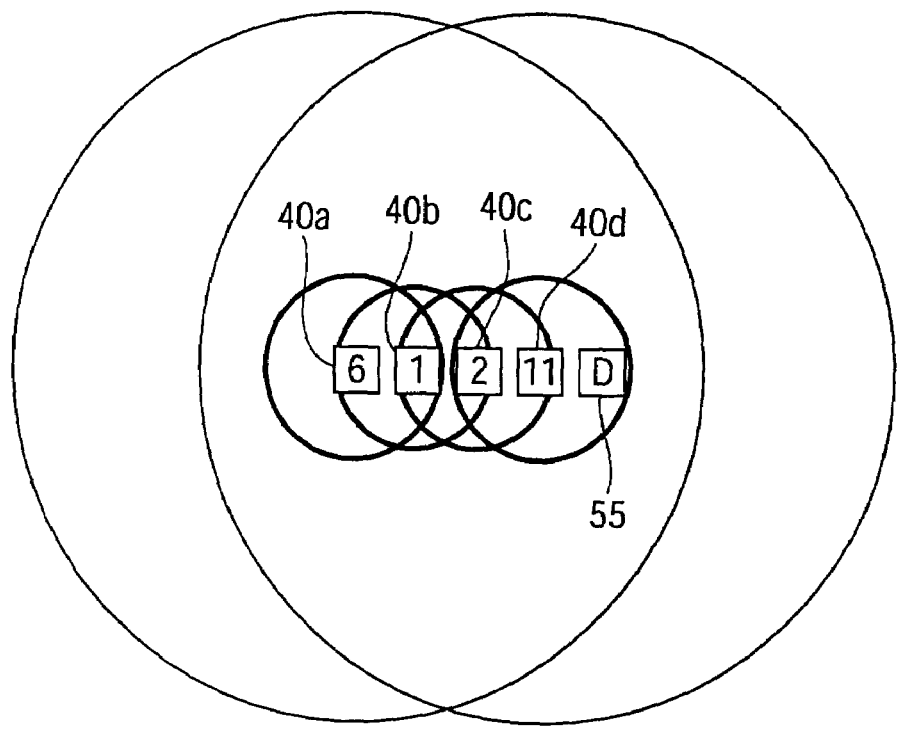
FIG. 6 is an example of wireless signal repeating for 2.4 GHz traffic utilizing a 5 GHz repeater backbone in accordance with another embodiment of the present invention.
Figure 7:
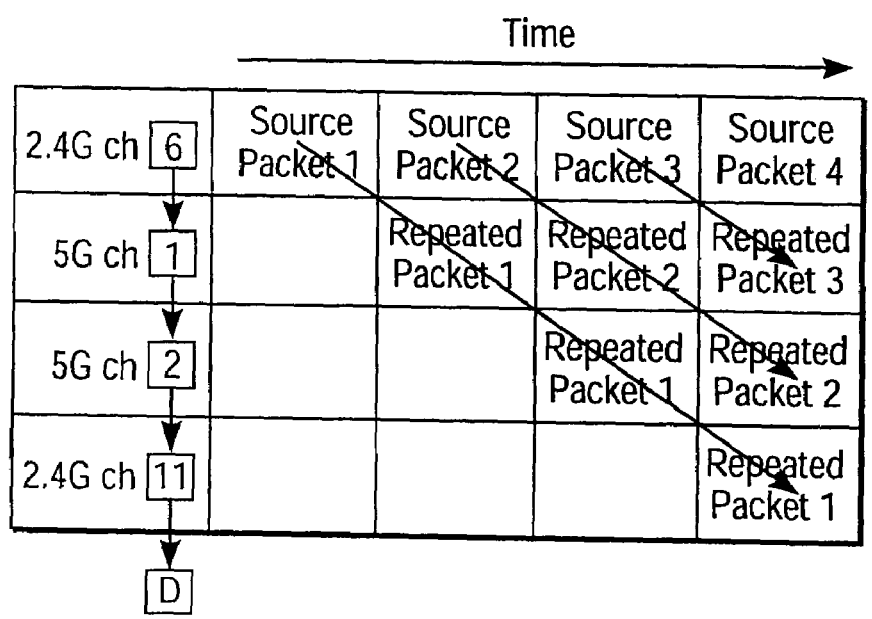
FIG. 7 is a chart illustrating pipelined data packet flow from source to destination in accordance with the embodiment of FIG. 6.

In addition to neighboring access points operating on different channels, different frequency bands may also be used during data transmission across the wireless network of the present invention. In an alternative embodiment, for instance, 5 GHz repeaters may be utilized to form an arbitrary length backbone for 2.4 GHz data traffic. This situation is illustrated in the example of FIGS. 6 & 7, which shows source access point 40a transmitting data packets to a 2.4 GHz destination 55 using 5 GHz repeaters 40b & 40c. Note that source point 40a and repeater 40d (transmitting to destination device 55) both operate in the 2.4 GHz band, but utilize different channels, i.e., channels #6 and #11, respectively, to prevent bandwidth loss.

Another possibility is to use a 5 GHz device at the destination and a 2.4 GHz access point at the source or vice-versa. As long as the network is configured for communications with source-to-destination frequency band transitions of 2.4 GHz to 5 GHz, or 5 GHz to 2.4 GHz, or 2.4 GHz to 2.4 GHz on different channels (all utilizing 5 GHz for repeaters in-between), the network can provide an arbitrary length backbone for 2.4 gigahertz traffic, despite the fact there are only three 2.4 GHz channels available. In other words, the wireless network of the present invention is not limited to data transmissions confined to a single frequency band.

Figure 8:
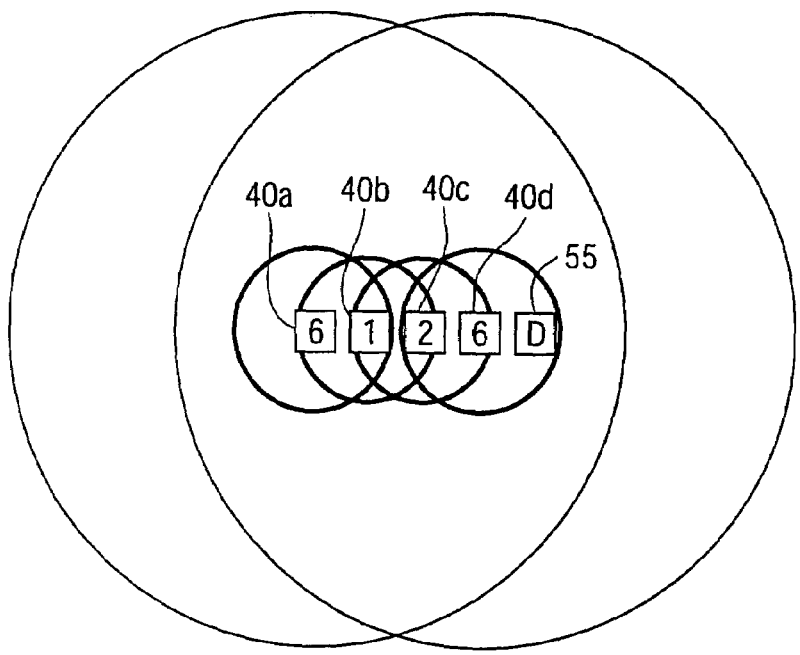
FIG. 8 is an example of wireless signal repeating for 2.4 GHz traffic utilizing a 5 GHz repeater backbone, with the source and destination on the same channel in accordance with yet another embodiment of the present invention.
Figure 9:
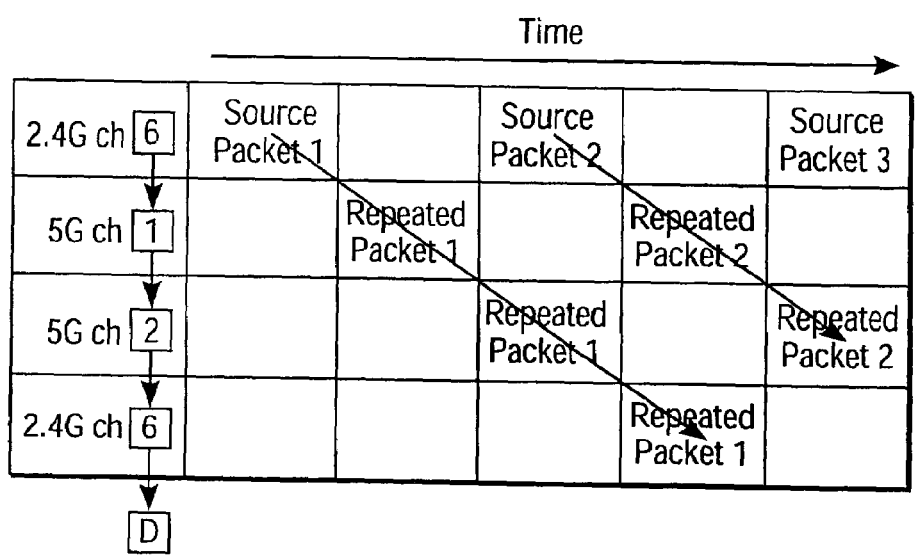
FIG. 9 is a chart illustrating pipelined data packet flow from source to destination in accordance with the embodiment of FIG. 8.

It is also possible to configure a wireless network in accordance with the present invention where the source and destination devices both operate at 2.4 GHz using the same channel. Such an embodiment is shown in the conceptual diagram of FIG. 8 and the associated transmission chart of FIG. 9, wherein source access point 40a and repeater 40d associated with destination media device 55 both operate in the 2.4 GHz band on channel #6. Repeaters 40b and 40c operate in the 5 GHz band on channel #1 and #2, respectively. Although this particular embodiment has a penalty of 50% bandwidth loss, the network still may be extended to arbitrary length with no additional bandwidth loss, regardless of the total distance covered. It is appreciated that the 50% bandwidth loss in this embodiment results from the need to stagger the data packet transmissions, as shown in the chart of FIG. 9, to avoid interference between the packet transmission by access point 40a and the packet transmission by repeater 40d.

Figure 10:
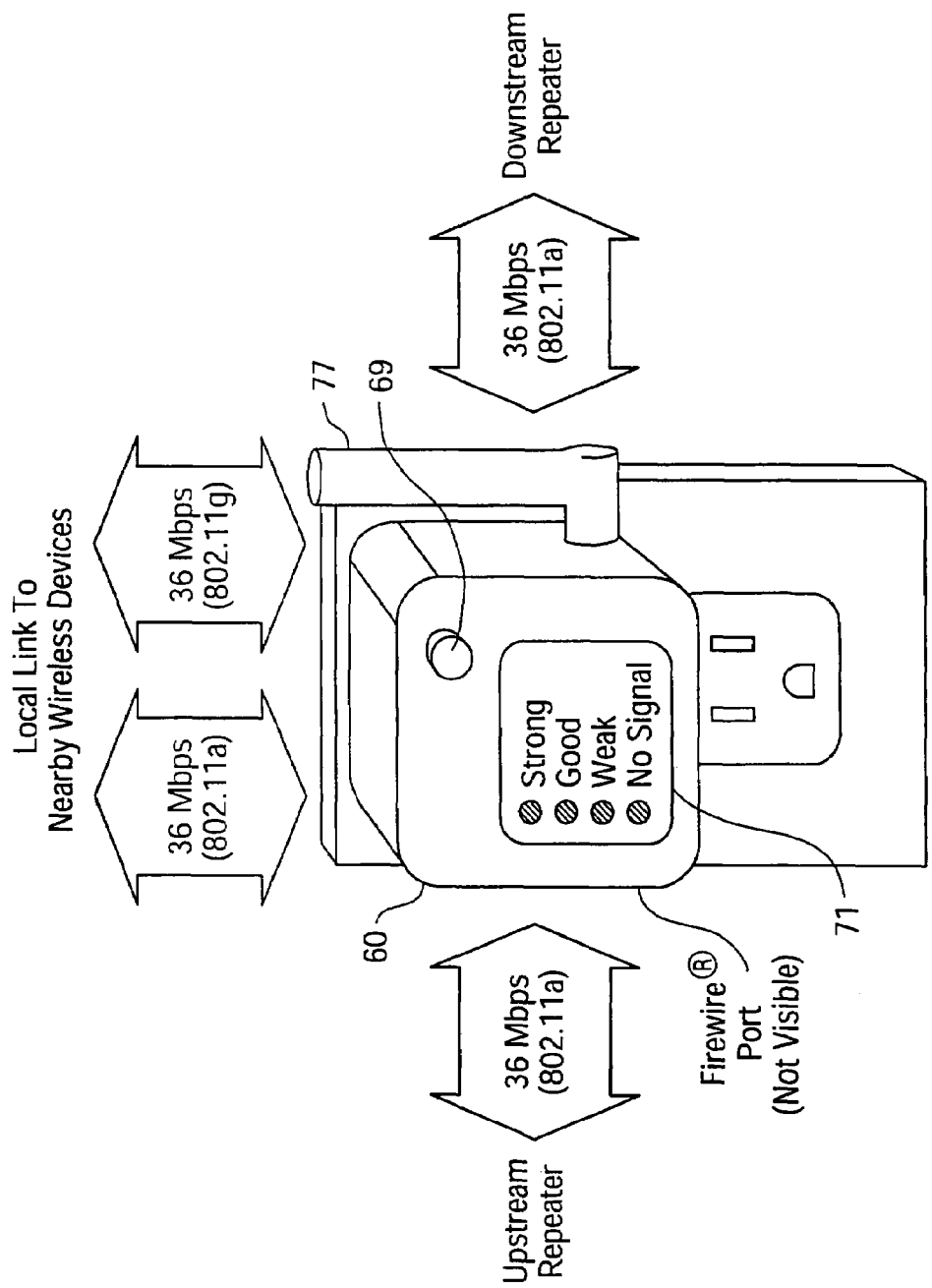
FIG. 10 is a perspective view of a wireless repeater in accordance with one embodiment of the present invention.
Figure 11:
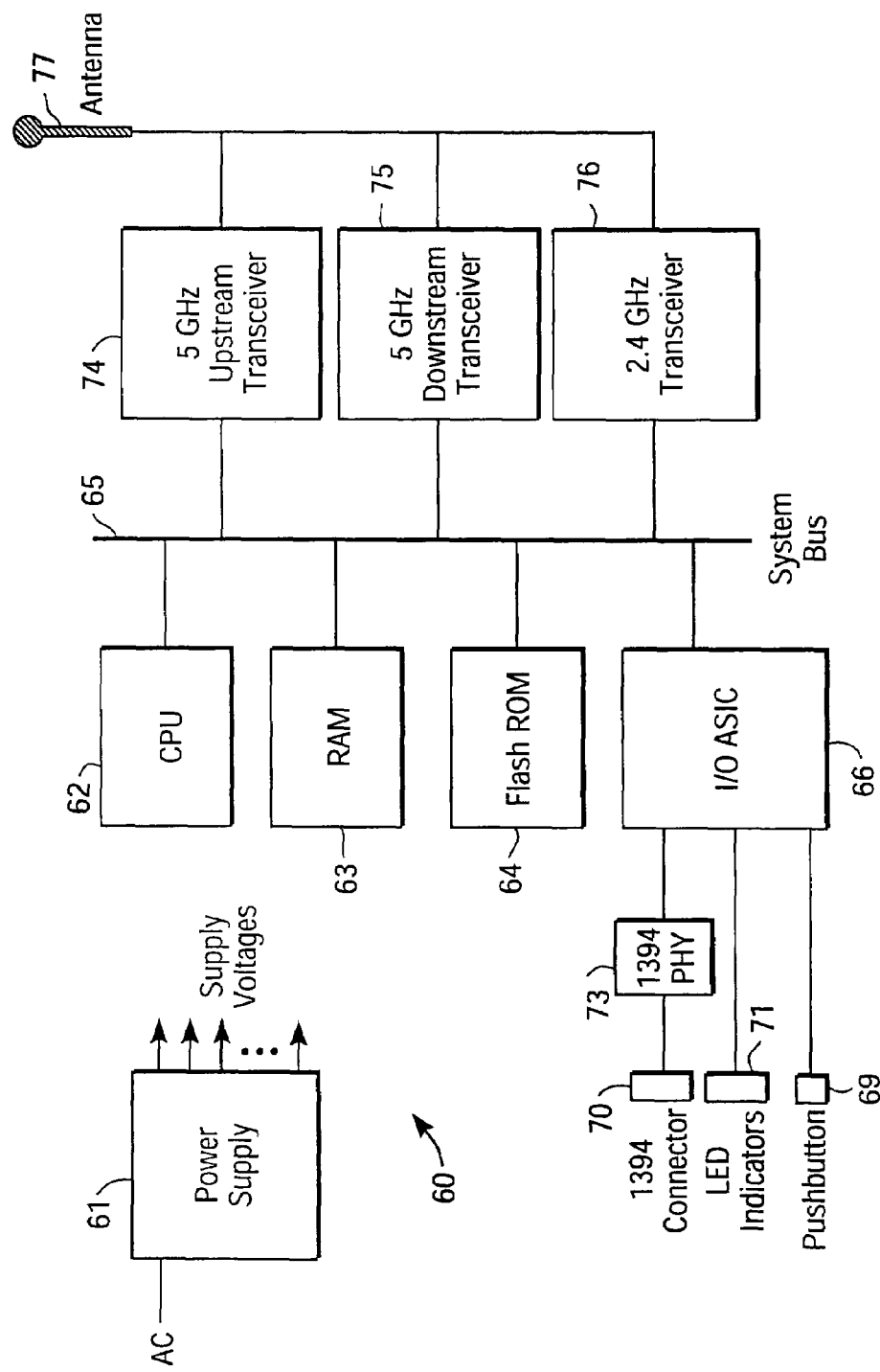
FIG. 11 is a circuit block diagram of the internal architecture of the wireless repeater shown in FIG. 10.

With reference now to FIG. 10, there is shown a perspective view of a wireless repeater unit 60 configured for installation in an ordinary electrical outlet in accordance with one embodiment of the present invention. FIG. 11 is a circuit block diagram of the internal architecture of repeater unit 60. Repeater unit 60 comprises a transformer/power supply 61 that provides supply voltages to the various internal electronic components, which include a CPU 62, a RAM 63, a Flash ROM 64, and input/output application specific integrated circuitry (I/O ASIC) 66, each of which is shown coupled to a system bus 65. Also coupled to system bus 65 are a plurality of transceivers, which, in this particular embodiment, include a 5 GHz "upstream" transceiver 74, a 5 GHz "downstream" transceiver 75, and a 2.4 GHz transceiver 76. Each of transceivers 74-76 is coupled to an antenna 77. Additional transceivers operating at different frequencies may be included in repeater unit 60.

CPU 62 controls the re-transmission of the received data packets, utilizing RAM 63 for both program execution, and for buffering of the packets as they are received from the upstream side, i.e., nearest the source, before they are sent out to the downstream side, i.e., toward the destination. Flash ROM 64 may be used to hold software and encryption key information associated with secure transmissions, for example, to insure that the network users are authorized users of satellite or cable subscriber services.

In the embodiment of FIG. 11, a 1394 connector interface 70 provides a Firewire® port (coupled through a 1394 PHY physical interface 73) to I/O ASIC 66. Also coupled to I/O ASIC 66 is a pushbutton switch 69 and an LED indicator panel 71. Pushbutton switch 69 may be utilized in conjunction with interface 70 to authenticate repeater unit 60 for use in the network after the wireless receiver or source access point has been initially installed. These aspects of the present invention will be described in more detail below.

By way of example, FIG. 10 further shows that the upstream repeater in the network comprises a wireless transceiver that operates in compliance with IEEE specification 802.11a to run with an effective throughput of 36 Mbps utilizing large packets of approximately 2500 bytes each. Persons of skill in the art will understand that IEEE 802.11a is a standard that permits use at more than one channel at a time. On the downstream side is another repeater that comprises a 5 GHz band, 802.11a wireless transceiver that operates on a different frequency channel. It should be understood that the present invention is not limited to these particular transceiver types or frequency bands. Other embodiments may utilize other types of transceivers; for instance, transceivers that operate in compliance with specifications that are compatible with IEEE specification 802.11a, 802.11b, or 802.11g, or which otherwise provide for wireless transmissions at high-bandwidths. For the purposes of the present application, IEEE specification 802.11a, 802.11b, 802.11g, and Industrial, Scientific, and Medical (ISM) band networking protocols are denoted as "802.11x".

Other non-ISM bands wireless network protocols could be utilized as well. For example, instead of utilizing 802.11a transceivers in the 5 GHz band, the network of the present invention could be implemented using transceivers compatible with HIPERLAN2, which runs with an effective throughput of about 42 Mbps.

Figure 12:
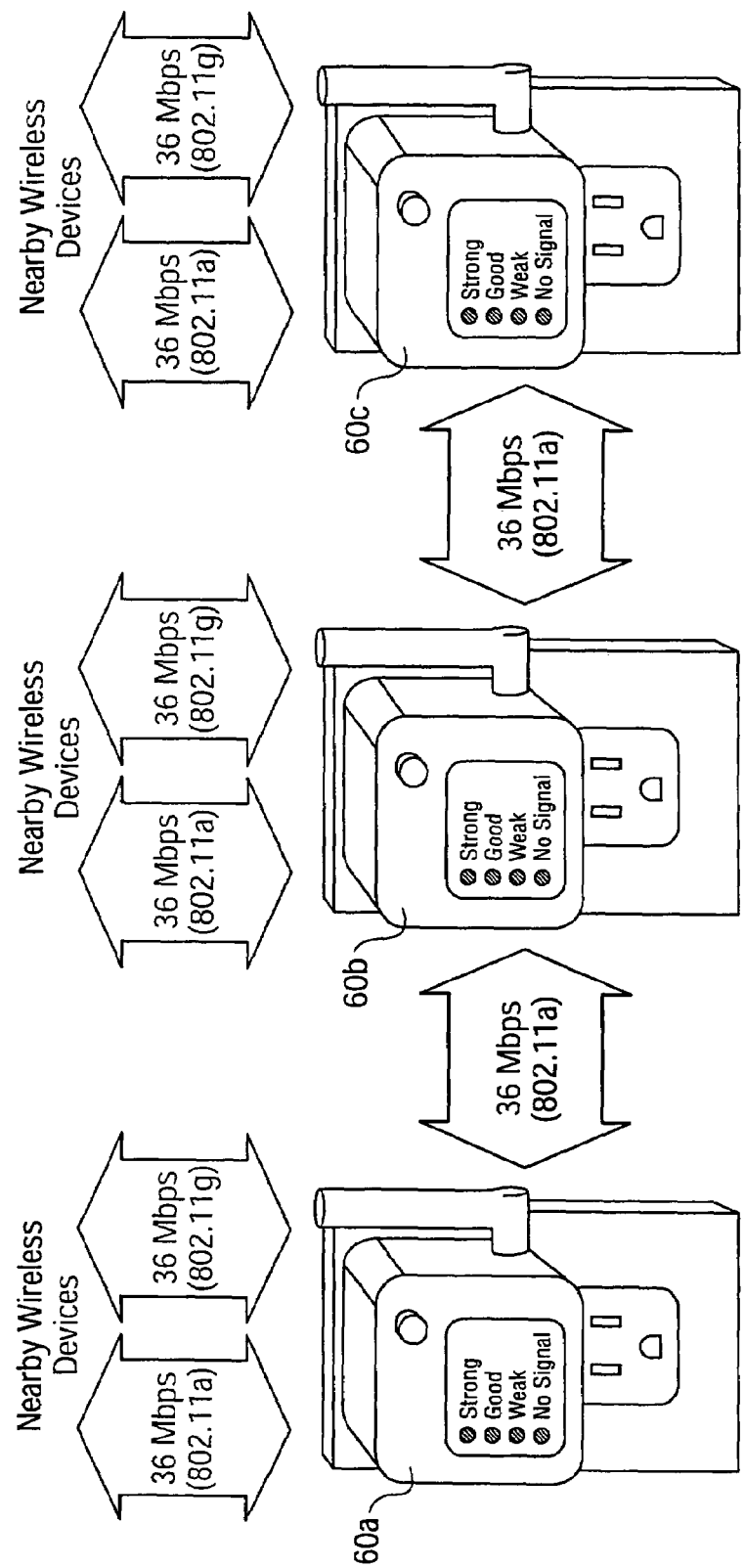
FIG. 12 illustrates three repeaters configured in a wireless network according to one embodiment of the present invention.

Transmissions between repeater unit 60 and client wireless media devices located nearby are shown at the top of FIG. 10. In this example, a 36 Mbps effective throughput link is provided through an 802.11g 2.4 GHz transceiver that may be used to connect to any local devices operating in the 2.4 GHz band. An 802.1a compatible transceiver may also be utilized to connect to local media devices operating in the 5 GHz band. In a network configured with multiple wireless repeaters, each wireless repeater may provide wireless communications to one or more local devices. FIG. 12, for example, illustrates three repeaters 60a-60c configured in a network wherein each repeater may provide a communication link to nearby wireless devices, such as laptop computers or wireless televisions, etc. Thus, by properly distributing repeater units throughout a home or office building, media content may be delivered at high bandwidths to client devices located anywhere in the home or office environment.

Repeater units 60 may be installed in the wireless network of the present invention after the source access point (e.g., source video receiver) has been made operational. In one embodiment, a new repeater unit 60 is first connected to the source access point or an existing repeater (one that is already plugged into an outlet and coupled to the wireless network) using a Firewire cable. The Firewire cable is connected between the existing repeater or source access point and the new repeater. Power is provided over the Firewire cable from the existing repeater or access point to the new repeater to activate the internal circuitry of the new repeater, so that encryption key information may be exchanged to allow the new repeater to securely connect to the network. Execution of program instructions for the exchange of encryption information may be initiated by the person performing the installation pressing pushbutton switch 69, located on the front side of repeater unit 60 in FIG. 10.

After the exchange of encryption information has completed, the Firewire cable between the two devices may be disconnected. The repeater unit with the newly activated encryption key may then be plugged into an electrical outlet in any location of the home or building where the user wants the network to extend.

Once repeater unit 60 is plugged in, it immediately outputs an indication of received signal strength on LED indicator panel 71. LED indicator panel 71 provides an indication of transmission signal strength to the upstream receiver, and may be advantageously used to locate repeater unit 60 to extend the network in a home or building. If, for example, the LED output indicates a strong signal, the installer may wish to remove the repeater unit from its present wall outlet location to a location farther away from the nearest existing repeater or access point. If, upon moving to a new location, LED indicator panel 71 outputs a "weak" or a "no signal" reading, this means that the new repeater is too far away from existing connection points of the network. In either case, the installer should move the repeater unit back closer to an existing repeater or access point until a "good" or "strong" signal strength is indicated.

Another option is to provide an audio indication of the transmission signal quality, instead of a visual indication.

Once the source access point (e.g., video receiver) detects the presence a newly-activated repeater unit, it automatically self-configures the cellular repeater wireless network. This aspect of the present invention will be explained in greater detail below.

Figure 13:
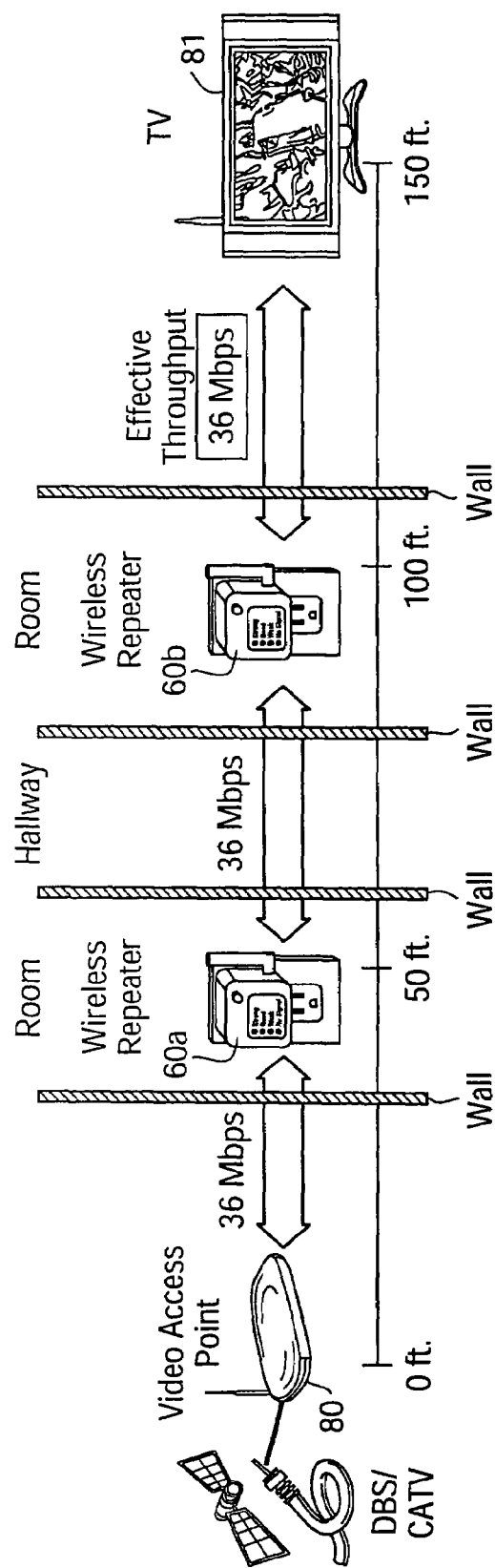
FIG. 13 is a diagram that shows the unlimited range at full bandwidth range of one embodiment of the present invention.

The example network shown in FIG. 13 illustrates the unlimited range at full bandwidth feature of one embodiment of the present invention. In FIG. 13, a video access point 80 is shown running at 36 Mbps to transmit information and video data downstream to a destination television 81 containing a wireless receiver located in a distant room. The video data may originate from a data service connection, such as a Direct Broadcast Satellite (DBS), DSL, or cable television (CATV), provided to access point 80. Repeaters 60a and 60b function as intermediary access points to distribute the video content to client media devices in their local vicinity and to repeat downstream data packets received on the upstream side. As can be seen, each repeater transmits at 36 Mbps so the effective throughput received at destination television 81 remains at 36 Mbps, i.e., without bandwidth loss.

Figure 14C:
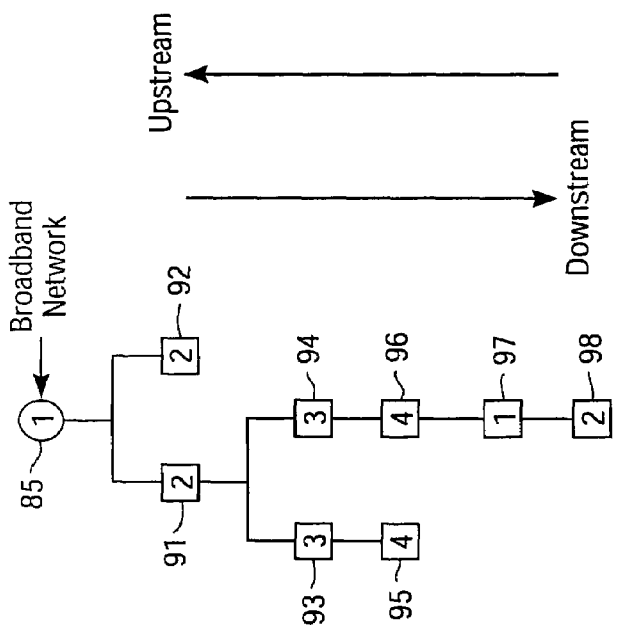
FIG. 14C illustrates the repeater topology for the first floor shown in FIGS. 14A & 14B.
Figure 14A:
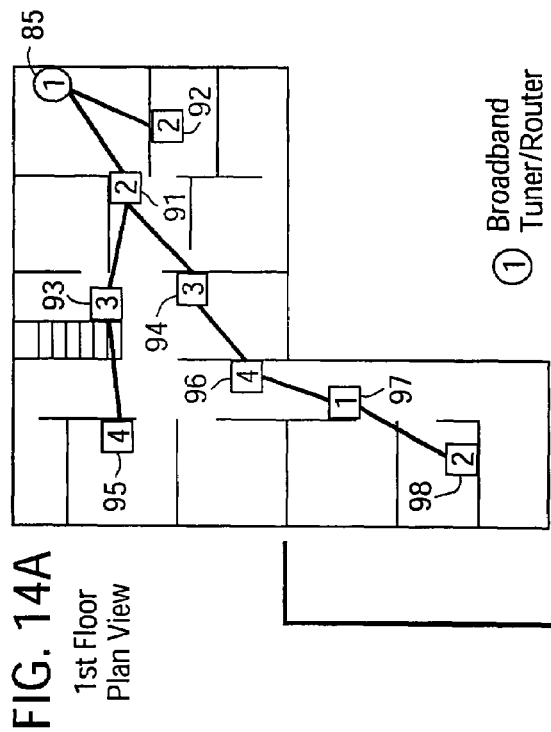
FIGS. 14A & 14B show a plan view and a side elevation view, respectively, of a floor plan for a building installed with a wireless network according to one embodiment of the present invention.
Figure 14B:
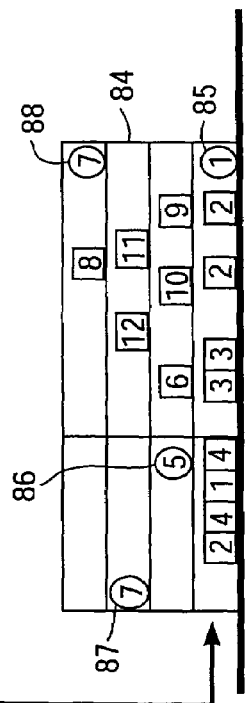

FIGS. 14A & 14B show a plan view and a side elevation view, respectively, of a floor plan of a building 84 installed with four separate, secure wireless networks according to one embodiment of the present invention. FIG. 14C illustrates the repeater topology for the network installed on the first floor plan shown in FIGS. 14A & 14B. Source access points (e.g., video tuners or data routers) in building 84 are denoted by circles, with the number inside the circle designating the frequency channel used. Additional access points (i.e., repeaters) are denoted by squares, with the number inside the square similarly designating the channel used for signal transmissions. In the example of FIGS. 14A-14C, four source access points 85-88 are each shown connected to a broadband network (e.g., cable, DSL, etc.), with each source access points functioning as a broadband tuner/router. Thus, four separate wireless networks are shown installed on separate floors of building 84.

With reference to the first floor plan shown in FIGS. 14A-14C, access point 85 transmits video data packets on channel #1 to repeaters 91 and 92, which then both repeat the received data packets on channel #2. Repeaters 93 and 94 (both on channel #3) are shown branching off of repeater 91. Repeater 95 (channel #4) is coupled to the network through repeater 93. Repeater 96 (channel #4) branches off of repeater 94; repeater 97 (channel #1) branches off of repeater 96; and repeater 98 (channel #2) branches off of repeater 97 to complete the first floor topology. Note that repeater 97 is able to reuse channel #1 since it is located a relatively far distance from source access point 85, which uses the same channel. Additionally, the side elevation view of FIG. 14B shows there are no devices on the second floor network above repeater 97 that use channel #1. For the same reasons, repeater 98 is able to reuse channel #2.

It is appreciated that access point 85 only needs one transceiver to create the repeating wireless network shown in FIGS. 14A-14C. The internal transceiver of access point 85 transmits on channel #1, which transmission is then received by the upstream transceivers of repeaters 91 and 92. Repeater 91 transmits using its downstream transceiver on channel #2, which is then picked up by the two upstream transceivers of repeaters 93 and 94, each of which, in turn, transmits on their downstream transceiver to repeaters 95 and 96, respectively, and so on. Note that in this example, access point 98 only transmits downstream to destination media devices, not to another access point. That is, access point 98 does not function as a repeater; rather, access point 98 simply communicates with the destination media devices in its local area.

Practitioners in the communications arts will also understood that nearby access points transmitting on the same channel in the first floor network shown in FIGS. 14A-14C (e.g., repeaters 91 & 92) do not interfere with one another. The reason why is because a given message or data packet is only transmitted down one path of the topology tree at a time. Moreover, according to the embodiment of FIGS. 14A-14C, each access point in the topology tree does not need an arbitrary number of transceivers to repeat data messages across the network; an upstream transceiver and a downstream transceiver suffices. As described previously, an additional 2.4 GHz band transceiver may be included, for example, to provide communications with 802.11b or 802.11g compatible devices. It should be understood, however, that there is no specific limit on the number or type of transceivers incorporated in the access points or repeaters utilized in the wireless network of the present invention.

Practitioners in the art will also appreciate that the tree structure of the wireless network of the present invention is well-suited to applications in which most of the bandwidth is provided from a single source (e.g., a satellite or cable feed). When the bulk of the bandwidth is from root to branch, the repeaters disposed in the branches the tree topology can share channels. When there is a lot of back-and-forth traffic, on the other hand, the repeaters in the tree structure have to operate on different channels, in case a message travels from one branch to another branch of the tree.

The self-configuring feature of the present invention is also apparent with reference to FIGS. 14A-14C. According to one embodiment of the present invention, a processor in the source access point executes a program or algorithm that determines an optimal set of frequency channels allocated for use by each access point or repeater. An optimal set of channels is one that does not include over-lapping channels and avoids channels used by other interfering devices in the same locality. An optimal channel configuration may also be selected that maximizes channel re-use. Further, once a set of the channels has been chosen for use by the access points, modulated power can be reduced to the minimum needed to achieve maximum bandwidth across each link so as to reduce signal reflections. As discussed below, the wireless network of the present invention may also adapt to changes to the network by reconfiguring the channel assignments, such as when new repeaters are added, existing ones removed, or when the network experiences disturbances caused by other interfering devices (e.g., from a neighboring network).

Note that in FIGS. 14A-14C, the first floor wireless network has been configured such that the channels used by each of the access points do not interfere with other devices located on other floors of building 84. The side elevation view of FIG. 14B shows that interference sources are present in the upper stories of building 84 above the wireless network created by source access point 85. To avoid interference with the devices using channels #5-#10 on the second through fourth floors, the first floor network has configured itself to use channel #1, #2, #3 and #4.

The circuitry for controlling the self-configuration process may either be centralized in the source access point or distributed throughout the access points comprising the wireless network. In either case, the system may proceed through a process of iteration, wherein every possible combination of channels allocated to the access points may be tried in order to find an optimal combination of frequency channels. In one embodiment, the network hops through the frequency channels automatically so that an optimal combination of frequencies may be determined. Within a matter of seconds, the network may complete iterating through all permutations of channels to identify which combination of frequencies produces the best result. One example of a best result is the highest average bandwidth from source to each destination. Another best result may be defined as one which optimizes bandwidth to certain destination devices. For instance, if a particular destination device (e.g., a video receiver) requires higher bandwidth than other destination devices, then allocation of channels may be optimized to provide higher bandwidth in the network path to the particular destination device at the expense of lower bandwidth to other devices.

The system of the present invention also functions to keep modulated power in the network to a minimum. It may be necessary in some instances, for example when transmitting through many walls to a maximum range, to use a lot of power. In other instances, a repeater is located nearby and there may be few walls to transmit through, so less transmission power is required. When the network initially turns on, the access points may transmit at maximum power to establish a maximum range of communication. However, once communications have been established with all of the repeaters in the network, the power output may be reduced to a level that provides adequate signal transmission characteristics (i.e., a threshold signal strength), but no more. In other words, the network may throttle power output, keeping it only as high as it needs to be to create a strong signal to the next repeater. One benefit of such an operation is that it reduces signal reflections that may interfere with the reception quality. Another benefit is less power consumption.

Another benefit of the power management feature of the present invention is that by having a given channel prorogate less distance, you create the opportunity to reuse that channel in the network at an earlier point in the topology than if transmissions were at maximum power.

According to one embodiment, the wireless network of the present invention automatically detects channel conflicts that arise, and adapts the network to the conflict by reconfiguring itself to avoid the conflict. That is, the access points monitor the signal quality of the wireless transmissions on a continual basis. Any disturbance or conflict that causes signal transmissions to fall below an acceptable quality level may trigger an adaptive reconfiguration process.

By way of example, FIGS. 15A and 15B show plan and side elevation views, respectively, of the wireless network previously shown in FIGS. 14A & 14B, but with a disturbance generated by the activation of a cordless phone (shown by square 101 operating on channel #2) in building 84. As shown, the interference caused by cordless phone 101 is within the range of repeaters 91 and 92, thereby affecting the transmissions of those repeaters. In accordance with one aspect of the present invention, the network automatically detects the channel conflict and reconfigures itself to overcome the interference.

FIGS. 16A and 16B illustrate the network of FIGS. 15A and 15B after reconfiguration to overcome the channel conflict caused by cordless phone 101. As can be readily seen, building 84 is populated with many existing channels in use. Because of the channel usage in the upper stories, the network cannot simply swap out the channels used by repeaters 91 & 92 with a different one. Instead, in this example, the wireless network of the present invention replaces channel #1 of source access point 85 with channel #5. That permits channel #1 to replace channel #2 in both repeaters 91 & 92. In addition, because the channel #1 usage by repeaters 91 & 92 would be too close to the channel #1 usage by repeater 97 (see FIGS. 15A & 15B), the wireless network also replaces channel #1 of repeater 97 with channel #8. Note that channel #8 can be used for repeater 97 because its only other use in building 84 is on the fourth floor at the opposite end of the structure. Repeater 98 is also shown reconfigured to use channel #1 instead of channel #2.

The adaptation process discussed above may be performed in a similar manner to the self-configuration process previously described. That is, all of the different possible combinations of channels may be tried until the network identifies an optimal combination that works to overcome the channel conflict without creating any new conflicts. The adaptation process may rely upon an algorithm that does not attempt to change or move channels which have already been established. In the example of FIGS. 16A and 16B, for instance, channel #3, used by repeaters 93 & 94, and channel #4, used by repeaters 95 & 96, are left in place. In other words, regardless of the origin of a channel conflict, the network of the present invention adapts to the disturbance by reconfiguring itself to optimize performance.

In the unlikely event that a channel conflict is truly unavoidable, i.e., no combination of channels exists that would allow the network to extend from the source to any destination without conflict (as could occur in a situation where there is heavy use of channels by neighboring networks) the wireless network of the present invention can reduce bandwidth and still maintain connectivity. Such a scenario is depicted in FIGS. 17A & 17B and FIGS. 18A & 18B.

FIGS. 17A & 17B illustrate the conflict previously shown in FIGS. 15A & 15B, wherein a cordless phone 101 is activated, except with an additional channel conflict created by a wireless camera 102 operating on channel #5. Here, due to the additional conflict caused by camera 102, there is no combination of channel allocations that might allow the network to reach from any source to any destination without conflict. In such a situation, the network has adapted by reusing the same channel in consecutive branches of the repeater topology, as shown in FIGS. 18A & 18B. FIGS. 18A & 18B show the reconfigured wireless network with repeaters 91 and 92 using channel #3. Because repeaters 93 and 94 also operate on channel #3 the bandwidth of the network is reduced by 50%. The benefit of the channel switching, however, is still preserved throughout the remainder of the network. Unlike a conventional repeating network that continues to lose bandwidth through each leg or repeating segment of the network, in the special situation exemplified in FIGS. 18A & 18B there is the only place in the network where bandwidth is lost. Moreover, the total bandwidth loss stays at 50%; that is, bandwidth is not continually reduced by each successive repeating segment of the network.

In yet another embodiment of the present invention, simultaneous wireless networks may be created to run at the same time. Simultaneous wireless networks may be desirable in certain applications, say, where there are three HDTV sets each operating at 15 Mbps. If the backbone of the primary network operates at 36 Mbps, the available bandwidth is insufficient to accommodate all three screens. The solution provided by the present invention is to install a second video tuner (i.e., a second source access point) and double up the number of repeaters through each branch of the rest of the topology.

Figure 19:
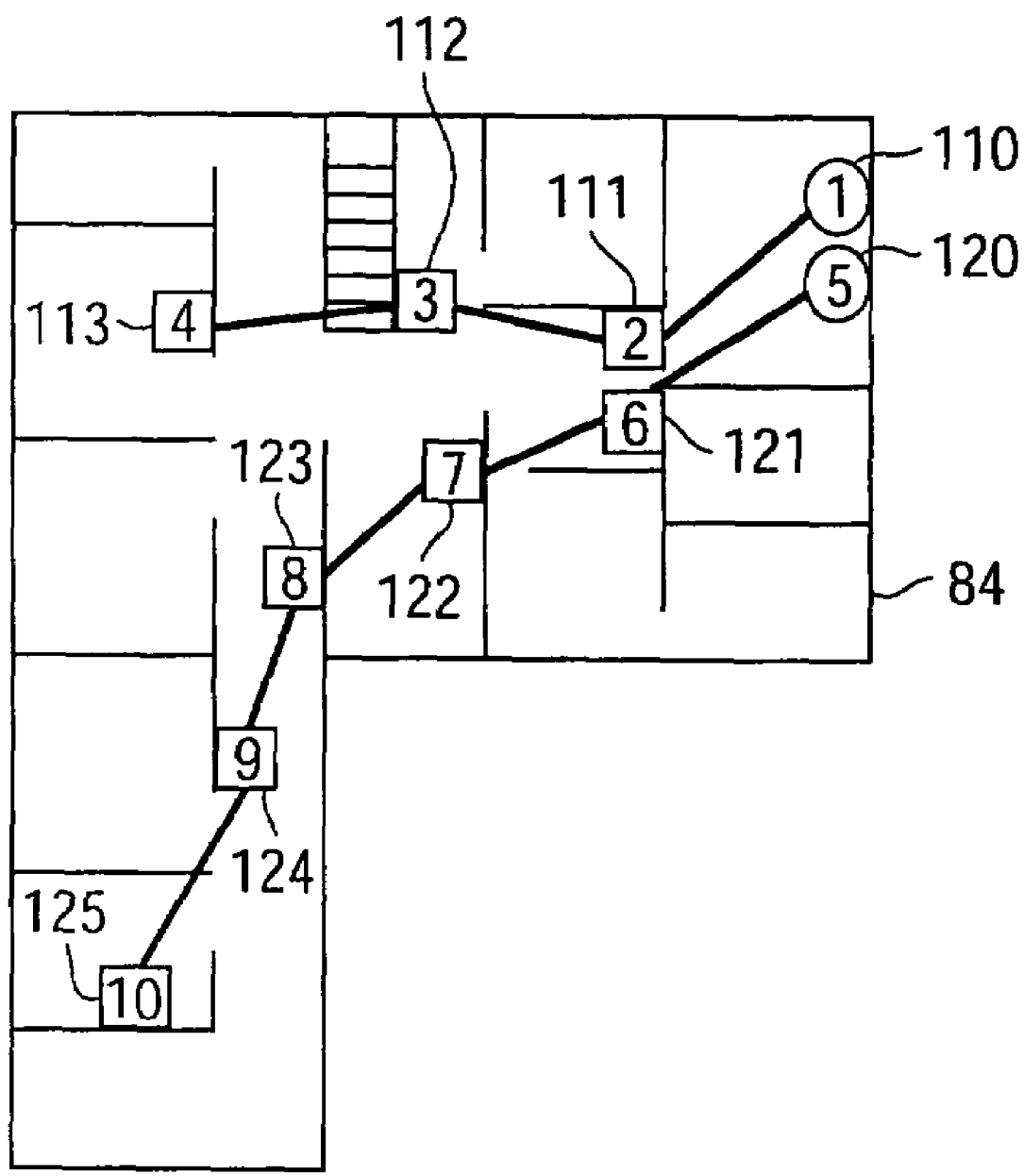
FIG. 19 is a floor plan showing two simultaneous wireless networks operating in a building according to one embodiment of the present invention.

FIG. 19 is a floor plan showing two simultaneous wireless networks operating in a building 84 to increase bandwidth. Such an arrangement is ideally suited to support multiple HDTV video streams. In the example of FIG. 19 access points 110 and 120 each comprise a wireless video tuner or router with a broadband connection. Access point 110 is shown operating on channel #1 and access point 120 is shown operating on channel #5. In this case, separate paths are created to the upper left and lower left sections of the floor plan. The path from access point 110 includes repeaters 111, 112 and 113 on respective channels #2, #3 and #4. Meanwhile, the path from access point 120 is implemented using repeaters 121, 122, 123, 124 and 125 on channels #6, #7, #8, #9 and #10, respectively.

It should be understood that as long as there are a sufficient number of channels available, bandwidth can be increased arbitrarily in the arrangement of FIG. 19. In other words, three, four, or more simultaneously running wireless networks may be implemented in a home or office environment to arbitrarily increase bandwidth to meet increasing data rate demands. If an adequate number of channels is available (e.g., allowing extension of the network across a sufficient distance for channel reuse), there is no limitation on the bandwidth that can be achieved in accordance with the present invention.

Figure 20:
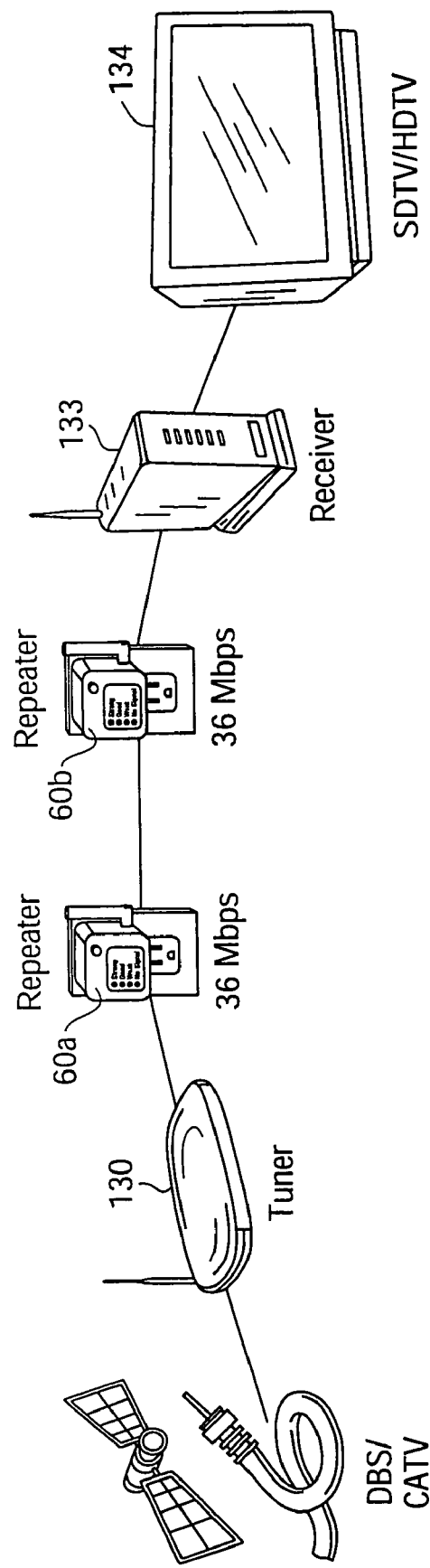
FIG. 20 shows a wireless network according to another embodiment of the present invention.

The security features provided by the wireless network of the present invention are discussed in conjunction with the example of FIG. 20. FIG. 20 shows a wireless network according to one embodiment of the present invention which includes a tuner 130 coupled to receive real-time streaming media from a source, such as DBS or CATV. Tuner 130 transmits the media content provided by the source, possibly through one or more repeaters, to a destination device, which in this example, comprises a wireless receiver 133, connected to a standard definition television 134. The media content provided by the source is, of course, encrypted. Only authorized users or subscribers are permitted access to the media content. Tuner 130 typically receives the media data from the cable or satellite provider in a digitally encrypted form. This encryption is maintained through the wireless network to SDTV 134. Wireless receiver 133 is a trusted device; that is, it is secured during installation by exchange of encryption key information. Consequently, receiver 133 is able to decrypt the media content when it arrives across the network from tuner 130. Thus, data security is preserved across the entire span of the wireless network, potentially over many repeater hops, so that interlopers or unscrupulous hackers are prevented from gaining unauthorized use of the wireless local area network.

In addition to encrypted data, the wireless network of the present invention may also transmit presentation layer data and information, such as overlay graphics and remote controls for interactive experiences. To put it another way, the network may also carry information both upstream and downstream.

Practitioners in the art will further appreciate that tuner 130 may also digitize analog video, decode it, and compress the received source data prior to transmission across the wireless network, in addition to receiving compressed digital video. In the case where compressed video is transmitted by tuner 130, receiver 133 decompresses the data as it is received. Alternatively, decompression circuitry may be incorporated into television 134 (or into an add-on box) that performs the same task. Receiver 133, or a wireless-enabled television 134, may identify itself as a device that requires high bandwidth to the upstream wireless repeaters 60 and tuner 130. When the network re-configures itself to avoid an interference source, it may take this requirement into consideration during channel allocation to optimize bandwidth in the network path from tuner 130 to receiver 133 or wireless-enabled television 134.

In an alternative embodiment, tuner 130 decrypts the real-time media stream as it is received from the satellite or cable service provider, and then re-encrypts that same data using a different encryption scheme that is appropriate for the wireless local area network. Thus, in this alternative embodiment, only devices properly enabled by the network are authorized to play media content received via that network. Note that because the wireless network in this embodiment of the present invention is a single or uni-cast signal, it can only be received by a properly enabled receiver that is authorized with appropriate encryption key information. In other words, the media content transmitted across the network from source to destination is not simply available to anyone who happens to have a receiver.

Still another possibility is for the cable or satellite company to grant an entitlement to tuner 130 that allows a certain limited number of streams (e.g., three or four) to be transmitted in a particular household or office environment, regardless of the number of media client devices that actually receive the media content. This is simply another way to restrict distribution of the media content.

Figure 21:
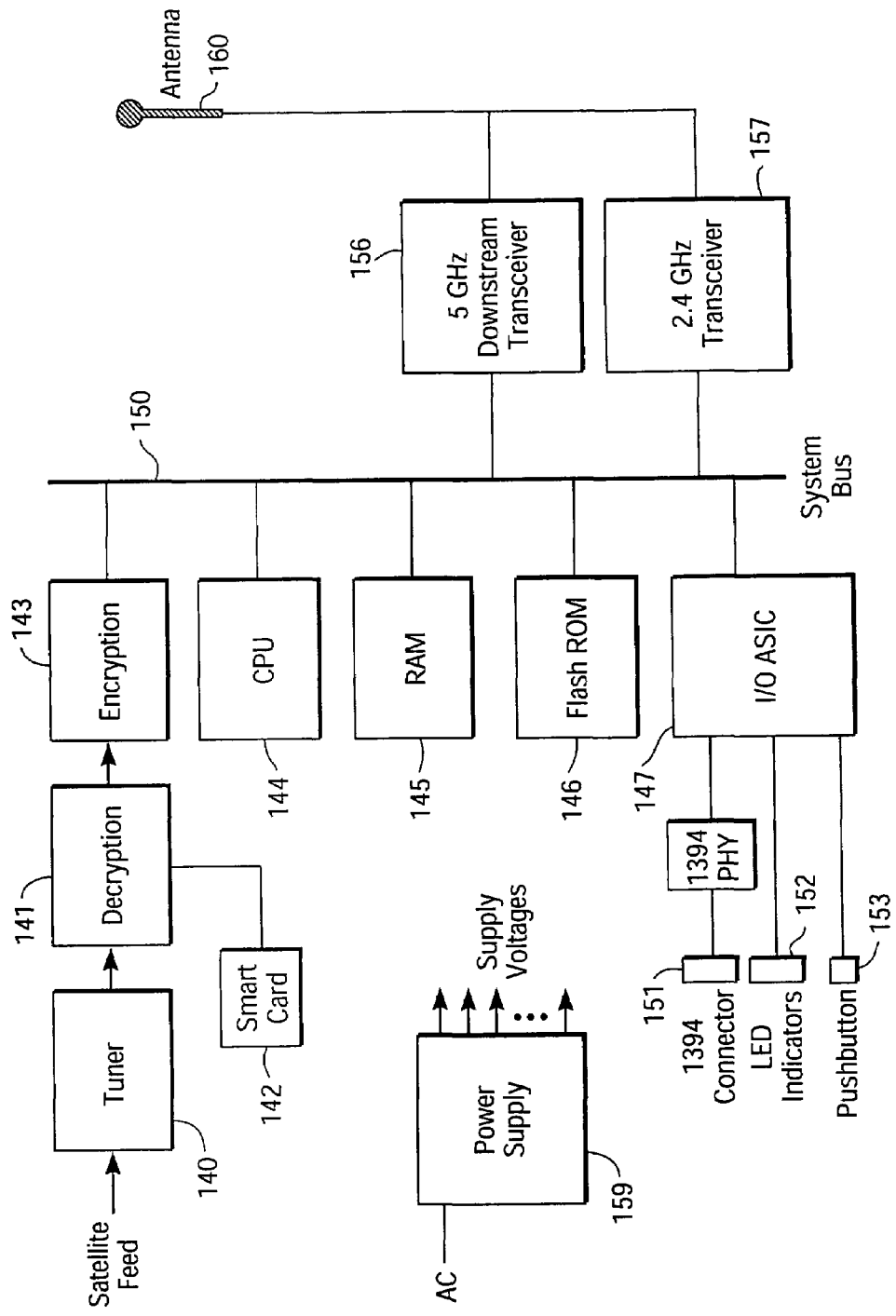
FIG. 21 is a circuit block diagram of the basic architecture of a DBS tuner according to one embodiment of the present invention.

In yet another alternate embodiment, tuner 130 receives video data packets from a DBS or digital cable TV source and buffers the packets in its internal RAM (see FIG. 21). The video data packets may then be grouped together into a larger packet. For example, an MPEG-2 transmission may have 188-byte packets, which would result in low efficiency over a 802.11x transport. By grouping these relatively small packets into a larger packets (e.g., twelve 188-byte packets grouped together to form a 2.256-Kbyte packet), better 802.11x efficiency can be achieved. Many conventional 802.11x networks incur a high probability of a transmission error when transmitting such large packets over long distances. The occurrence of such an error, of course, requires re-transmission of the packet, with the same risk of another error happening during the re-transmission. By utilizing repeaters separated by relatively short distances (i.e., within the maximum bandwidth range of the repeaters), the transmission error rate is dramatically reduced (e.g., $<10^{-6}$) as compared to conventional wireless networks. Thus, because larger packets (e.g., 500 bytes or greater) may be utilized, the wireless network of the present invention is capable of achieving a high effective throughput (e.g., as much as 36 Mbps or greater) at low error rates. By way of example, and not limitation, one embodiment of the present invention is capable of achieving approximately 32 Mbps effective throughput, transmitting 2.256-Kbyte packets across an 802.11x network of arbitrary length with a bit error rate of about $10^{-7}$ or less.

Another feature of the present invention is the ability to serendipitously provide connectivity to any user who happens to be within the range of the wireless network. If, for instance, a wireless repeater or access point is mounted near a window or on the rooftop of a building, the outdoor range of the wireless network may be extended to a nearby park or other buildings (e.g., a café or coffeehouse). A user who has a laptop computer configured with an existing wireless transmitter and receiver, and who happens to be within the range of the wireless network, could connect to the Internet; view a video program; listen to an audio program; or store media content on its disk drive for retrieval and play at a later time (assuming proper entitlements). In other words, the present invention provides ever greater mobility by allowing portable computer users to take media content with them.

Media content may also be downloaded from the wireless network for archival storage on a wireless disk server.

Those of ordinary skill in the art will further appreciate that the wireless network of the present invention is client device independent. It does not matter to the network what type of device is at the destination end receiving the transmitted media content. Video and graphics content carried on the WLAN of the present invention can play on multiple types of television, computers (e.g., Macintosh® or PC), different MP3 players, PDAs, digital cameras, etc. By way of example, any PC or Mac equipped with a 2.4 GHz band wireless card can detect the presence of the wireless network. Once it has detected the running wireless network, it may download a driver that contains the necessary security and protocol information for accessing the media content. Readily available software, such as RealPlayer®, QuickTime®, or Windows® MediaPlayer, may be used to play content provided through the network.

With reference now to FIG. 21, a circuit block diagram showing the architecture of a DBS tuner according to one embodiment of the present invention is shown. Similar to the architecture of the repeater unit shown in FIG. 11, a CPU 144, a RAM 145, a Flash ROM 146, and I/O ASIC 147 are coupled to a system bus 150. A 5 GHz band downstream transceiver 156 and a 2.4 GHz band transceiver 157, both of which are connected to antenna 160, are also coupled to system bus 150. (An upstream transceiver is not needed at the source end.)

Data from the satellite feed is received by a tuner 140 and output to decryption circuitry 141, which may be configured to receive the latest encryption key information from a smart card 142. The decrypted digital stream output from block 141 is then re-encrypted by encryption circuitry 143 prior to being sent over the wireless network. As discussed above, the re-encryption is a type of encryption appropriate for the wireless network, not one that is locked into the satellite encryption scheme.

The architectural diagram of FIG. 21 is also shown including connector, indicator, and pushbutton blocks 151-153, as previously described in conjunction with FIG. 11. A power supply unit 159 provides a supply voltage to the internal electronic components of the tuner.

Figure 22:
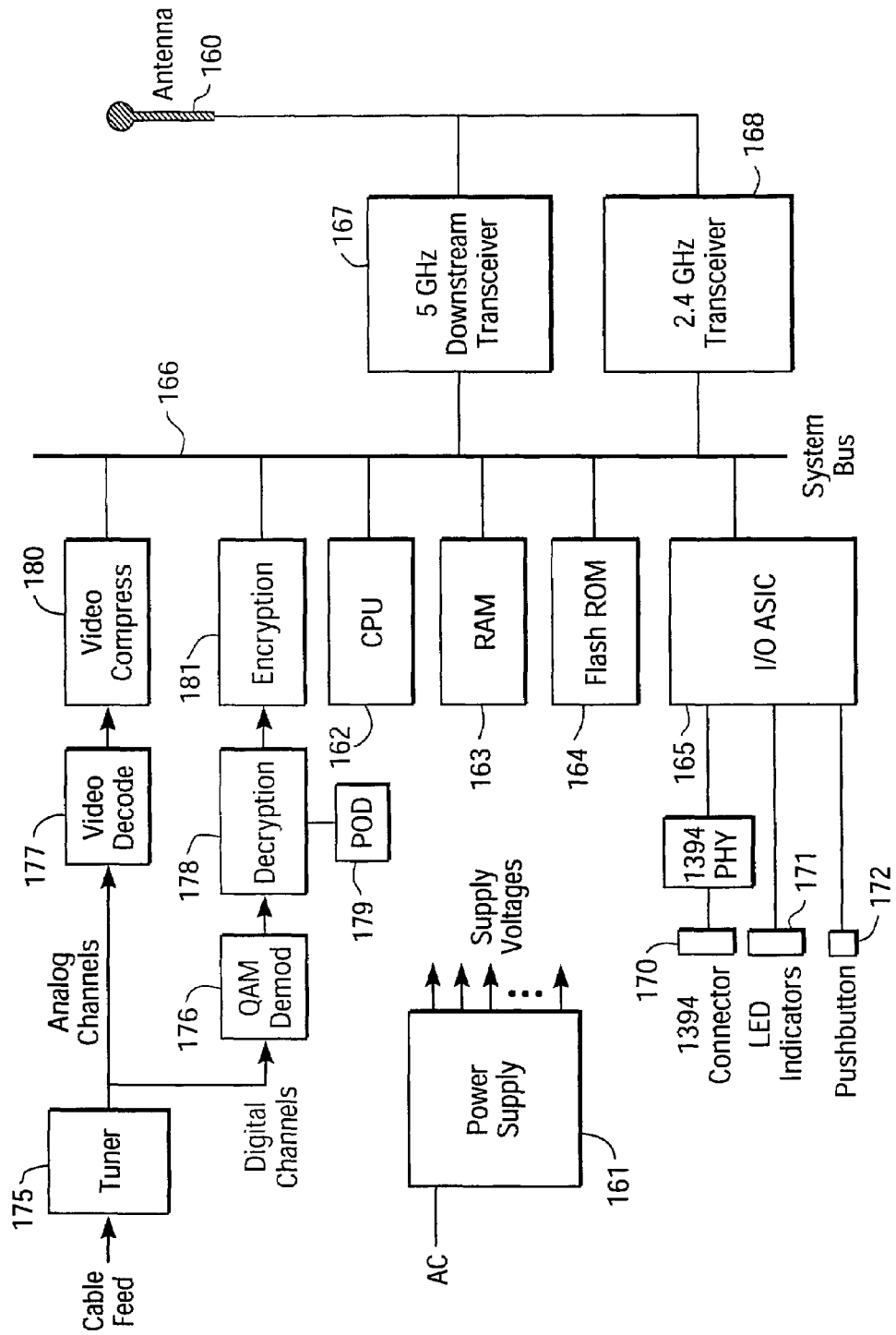
FIG. 22 is a circuit block diagram of the basic architecture of a cable television tuner in accordance with one embodiment of the present invention.

FIG. 22 is a circuit block diagram illustrating the basic architecture of a cable television tuner in accordance with one embodiment of the present invention. Practitioners in the art will appreciate that the architecture of FIG. 22 is somewhat more complicated due to the presence of both analog and digital signal channels. Elements 161-172 are basically the same as the corresponding components of the DBS tuner described above.

Tuner 175 receives the cable feed and separates the received signal into analog or digital channels, depending on whether the tuner is tuned to an analog or digital cable channel. If it is an analog channel, the video content is first decoded by block 177 and then compressed (e.g., MPEG2 or MPEG4) by circuit block 180 prior to downstream transmission. If it is a digital channel, a QAM demodulator circuit 176 is used to demodulate the received signal prior to decryption by block 178. A point of deployment (POD) module 179, which includes the decryption keys for the commercial cable system, is shown coupled to decryption block 178. After decryption, the streaming media content is re-encrypted by block 181 before transmission downstream on the wireless network.

FIG. 22 shows a one-way cable system. As is well-known to persons of ordinary skill in the art, a two-way cable system further includes a modulator for communications back up the cable, as, for example, when a user orders a pay-per-view movie.

Figure 23:
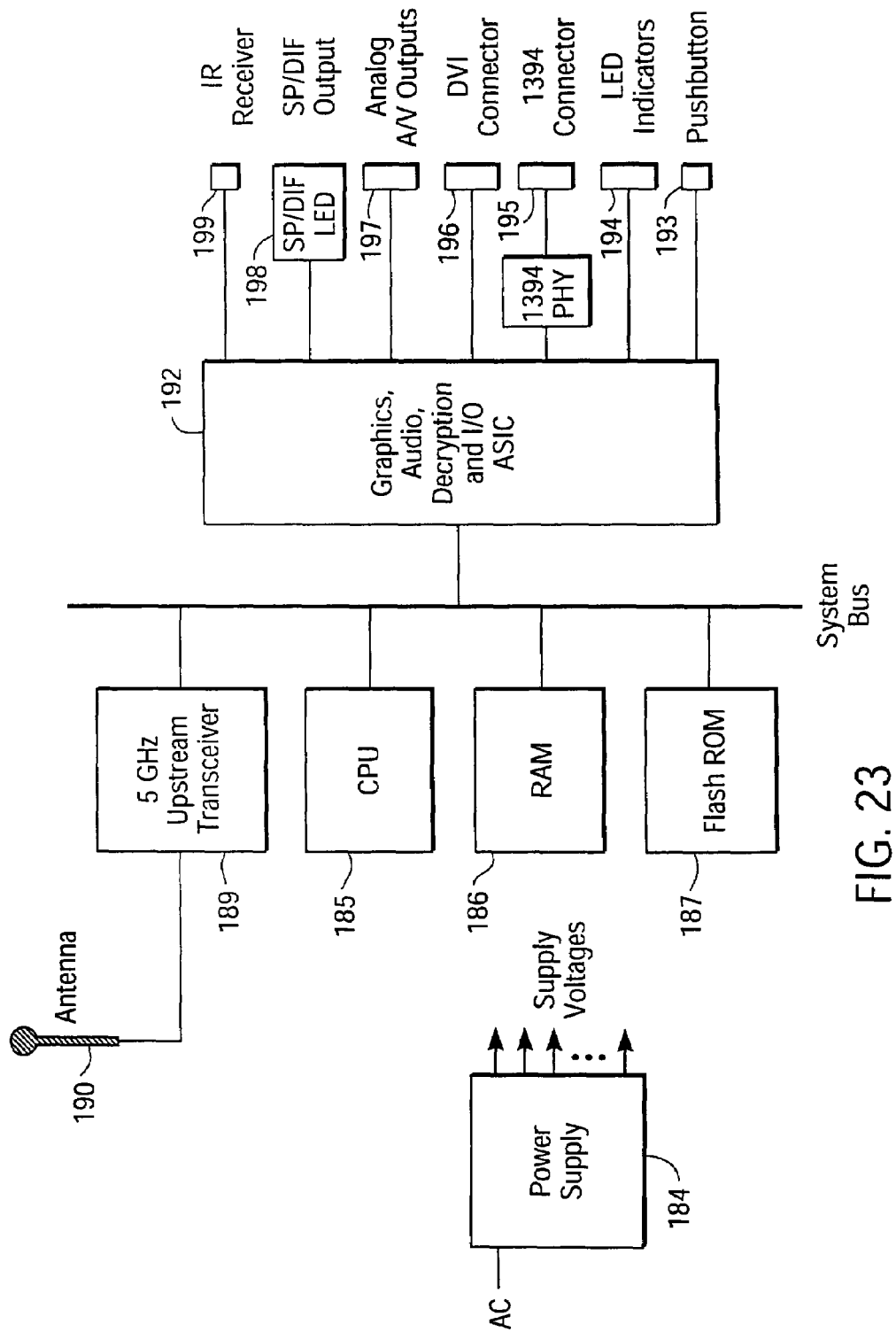
FIG. 23 is a circuit block diagram of the basic architecture of a wireless receiver in accordance with one embodiment of the present invention.

FIG. 23 is a circuit block diagram illustrating the basic architecture of a wireless receiver in accordance with one embodiment of the present invention. Like the repeater, DBS tuner, and cable tuner architectures described previously, the wireless receiver shown in FIG. 23 includes a CPU 185, a RAM 186, and a Flash ROM 187 coupled to a system bus 188. A power supply unit 184 provides a supply voltage to each of the circuit elements shown.

A 5 GHz band upstream transceiver 189 is shown in FIG. 23 coupled to an antenna 190 and to system bus 188. A single transceiver is all that is required since the receiver of FIG. 23 does not transmit downstream and it outputs directly to a display device such as a television. As described earlier, the 5 GHz band offers the advantage of more available channels. I/O ASIC circuitry 192 coupled to bus 188 includes the graphics, audio, decryption, and I/O chips (commercially available from manufacturers such as Broadcom Corporation and ATI Technologies, Inc.) needed to generate the output signals for driving the display device. In addition to elements 193-195 found on the repeater architecture of FIG. 11, I/O ASIC 192 may also provide outputs to a DVI connector 196 (for HDTV), analog audio/video (A/V) outputs 197, an SP/DIF output 198 (an optical signal for surround sound and digital audio), and an infrared receiver port 199 for receiving commands from a remote control unit.

Figure 24:
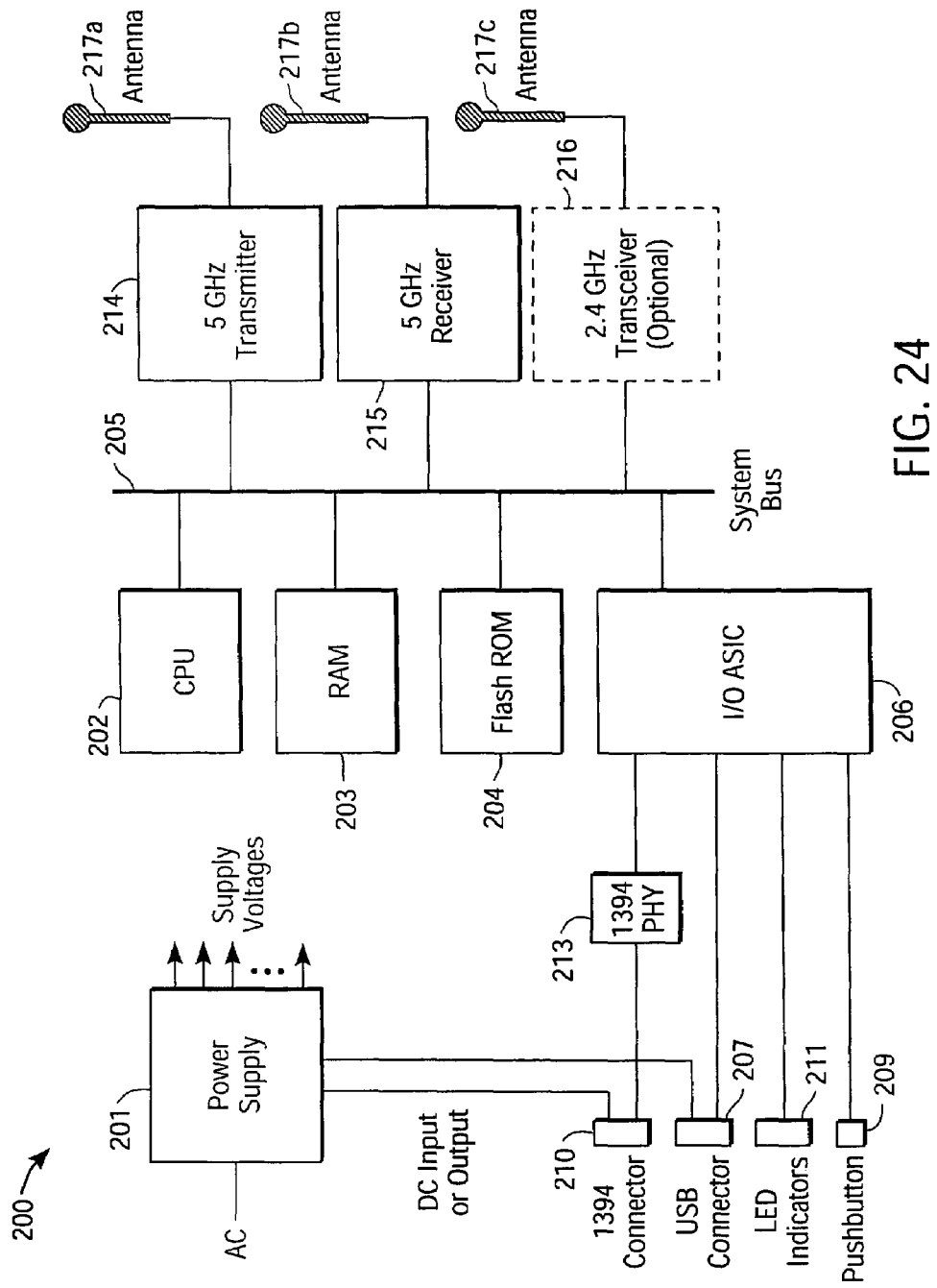
FIG. 24 is an architectural block diagram of a wireless repeater according to another embodiment of the present invention.

FIG. 24 is a circuit block diagram of the internal architecture of a repeater 200 according to another embodiment of the present invention. Repeater 200 is similar to repeater unit 60 shown in FIG. 11, except for several design changes. For instance, repeater 200 utilizes a single transceiver for upstream and downstream transmissions rather than two transceivers, as described in the previous embodiments. The single transceiver of repeater 200 is separated into a 5 GHz band transmitter 214 and a 5 GHz band receiver 215, both of which are coupled to a system bus 205. An optional 2.4 GHz band transceiver 216, also shown coupled to a system bus 205, may be included if the repeater is intended to function as an access point for two-way communications with 2.4 GHz destination devices located in the vicinity of repeater 200. In the case where repeater 200 operates exclusively as a repeater or a 5 GHz access point, but not as a 2.4 GHz access point, transceiver 216 may be omitted.

Note that transmitter 214, receiver 215, and optional transceiver 216 are each shown connected to physically separate antennas 217a, 217b, and 217c, respectively, to provide better signal isolation. Antennas 217 may be implemented as externally mounted wireless antennas, or internal antennas, each having a separate physical wire connection. Any of the previously described access points, repeaters, tuners, etc., may also be implemented with separate antennas for each different transceiver. Alternatively, transmitter 214, receiver 215, and optional transceiver 216 may all be connected to a single antenna as shown in the previous embodiments.

Transformer/power supply 201 provides supply voltages to the various internal electronic components, which include a CPU 202, a RAM 203, a Flash ROM 204, and input/output application specific integrated circuitry (I/O ASIC) 2066, each of which is shown coupled to a system bus 205. These components operate in the same manner as described in the previous embodiments. For example, a 1394 connector interface 210 provides a Firewire® port (coupled through a 1394 PHY physical interface 213) to I/O ASIC 206. A pushbutton switch 209 and an LED indicator panel 211 are also coupled to I/O ASIC 206. Switch 209 and panel 211 function in the identical manner described in conjunction with FIG. 11. A Universal Serial Bus (USB) connector 207 is coupled to I/O ASIC 206 to provide an additional connection port, which may be used as an alternative to 1394 connector interface 210.

The embodiment of FIG. 24 further comprises D.C. power connections from supply 201 to connectors 210 and 207 for the purpose of accommodating versions of these connectors that include power supply pins. For example, 1394 connectors are commercially available in 4-pin and 6-pin versions; the 6-pin version being capable of receiving/providing power from/to its mated connector. In the case where repeater 200 is configured with the 6-pin connector version, it may draw power from another repeater or source device (e.g., a digital video recorder), thereby permitting repeater 200 to receive encryption key information to allow repeater 200 to join the wireless network. Receiving power from a connection to another device obviates the need to have to plug repeater 200 into an A.C. supply line. All USB connectors such as 207 are configured with power supply pins and may be utilized in exactly the same way. Again, the previous embodiment of FIG. 11 may be modified to include this feature.

It is appreciated that since transmitter 214 and receiver 215 may be located in close physical proximity to one another, cross-channel signal interference may occur. This can be avoided by selecting transmission frequencies that are as far apart as possible. According to one embodiment of the present invention, when transmitter 214 and receiver 215 operate simultaneously it is advantageous to choose frequency channels for each that are not adjacent to one another. For example, since there are twelve channels currently available in the 5 GHz band, the architecture of the present invention attempts to choose send/receive frequency channels for transmitter 214 and receiver 215 that are as far apart as possible (e.g., channels 1 & 12), as opposed to adjacent channels (e.g., channels 1 & 2), to avoid signal interference. Channel selection for transmitter 214 and receiver 215 may be performed by CPU 202, or alternatively by another CPU (e.g., the CPU of the source access point) in the wireless network.

Figure 25:
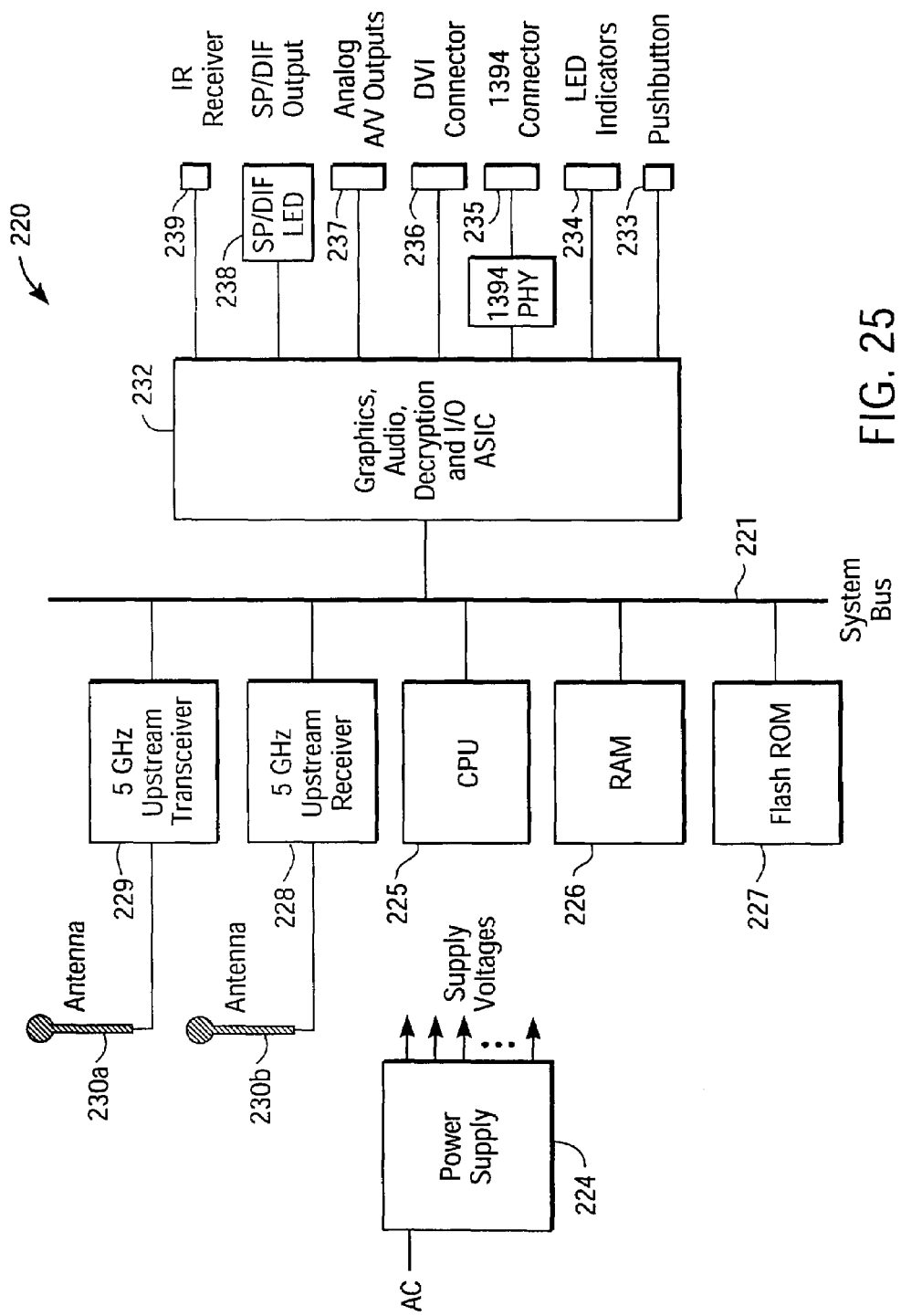
FIG. 25 is an architectural block diagram of a wireless receiver in accordance with another embodiment of the present invention.

The same concept of utilizing a single transceiver with transmitter and receiver sections that can operate independently and simultaneously may also be applied to a wireless receiver coupled to a television or other display device. By way of example, FIG. 25 is a circuit block diagram of a wireless receiver 220 that includes a 5 GHz band upstream transmitter 229 coupled to an antenna 230a and to system bus 221. Since receiver 220 does not transmit downstream (i.e., it outputs directly to a display device such as a television) a 5 GHz band upstream receiver 228 is also included coupled to system bus 221 and antenna 230b. Alternatively, transmitter 229 and receiver 228 may share a single antenna, as shown in the previous embodiment of FIG. 23.

Receiver 220 also comprises an I/O ASIC 232 coupled to bus 221. I/O ASIC 232 includes the graphics, audio, decryption, and I/O chips for generating the output signals used to driving the television or display device. The elements 224-227 and 233-239 are the same as the corresponding elements described in conjunction with the architecture of FIG. 23. I/O ASIC 192 may also provide outputs to a DVI connector 196 (for HDTV), analog audio/video (A/V) outputs 197, an SP/DIF output 198 (an optical signal for surround sound and digital audio), and an infrared receiver port 199 for receiving commands from a remote control unit.

Figure 26A:
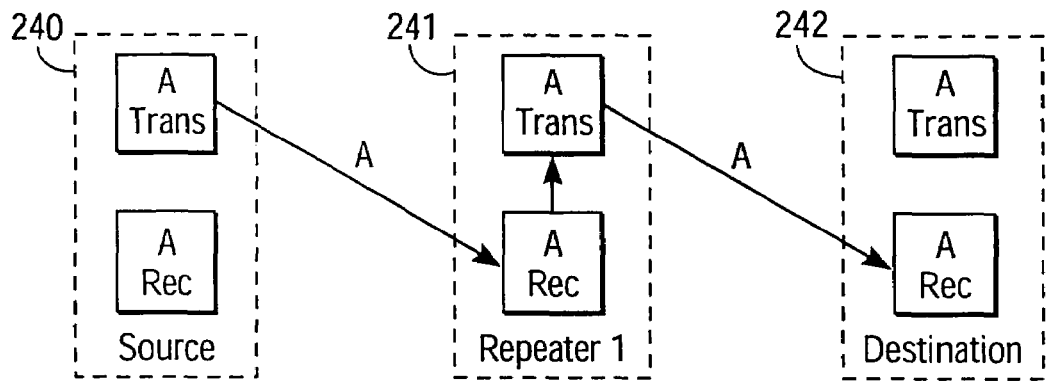
FIGS. 26A & 26B illustrate a prior art approach to access point transmission repeating.
Figure 26B:
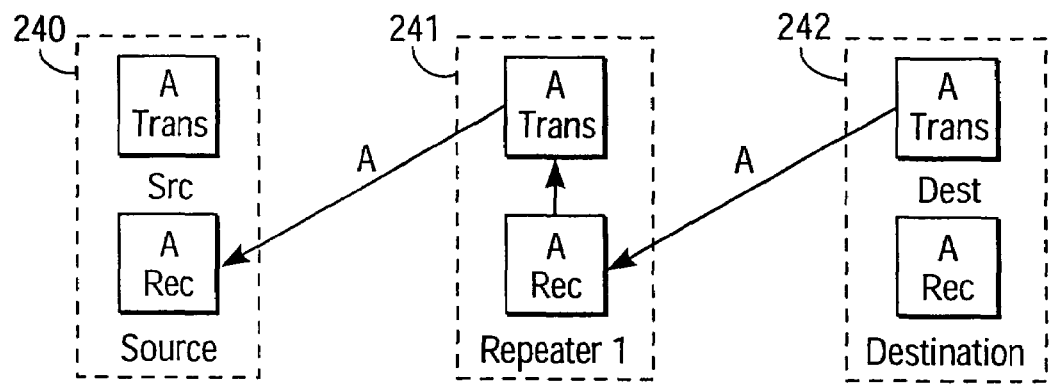

FIGS. 26A & 26B illustrate a prior art approach to access point repeating in which messages are transmitted and received across a wireless network on the same frequency channel. FIGS. 26A & 26B show, by way of example, a source access point 240, a repeater 241, and a destination device 242 transmitting and receiving on frequency channel "A" for both downstream (FIG. 26A) and upstream (FIG. 26B) transmissions. As discussed earlier, the drawback of this approach is a loss of bandwidth. For instance, with one repeater in the network chain there is a 50% loss of bandwidth, two repeaters results in a 67% bandwidth loss, and so on.

Figure 27A:
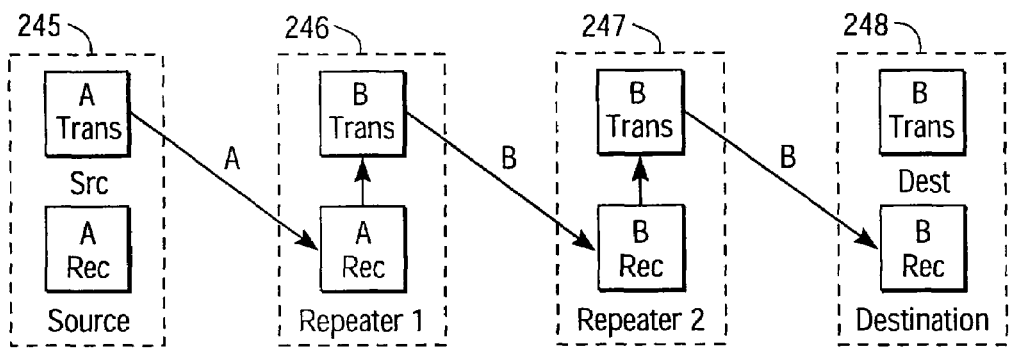
FIGS. 27A & 27B show examples of access point repeating in a network utilizing two repeaters in accordance with one embodiment of the present invention.
Figure 27B:
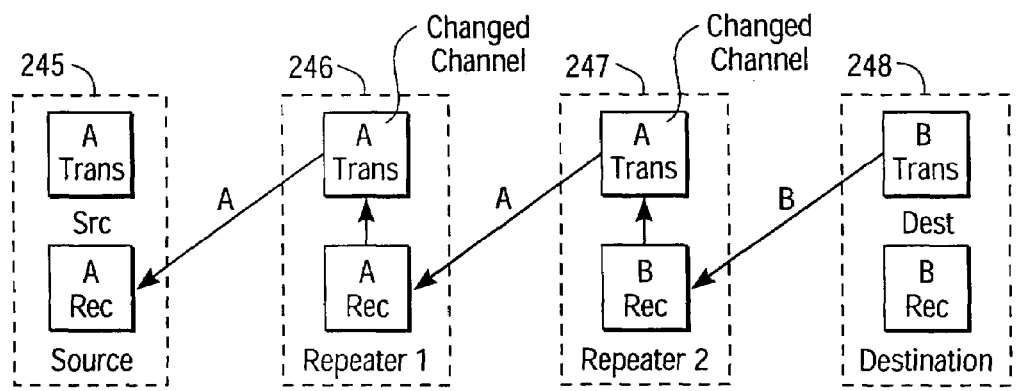

FIGS. 27A & 27B respectively show downstream and upstream transmissions in a wireless network utilizing two repeaters to provide a transmission link between a source access point 245 and a destination device 248 in accordance with one embodiment of the present invention. In the network of FIGS. 27A & 27B, each of the repeaters 246 and 247 function as access points for communications with destination devices located in their immediate vicinity as well as repeaters for transmissions across the network, e.g., such as to destination device 248. Because repeaters 246 and 247 function both as access points and repeaters, their receivers operate on a frequency channel that does not change. For example, repeaters 246 and 247 are respectively shown operating on frequency channels "A" and "B" for both upstream and downstream transmissions. Maintaining a steady reception frequency channel in repeaters 246 and 247 allows nearby devices, such as a laptop computer, to access the network via the repeaters.

In the example diagrams of FIGS. 27A & 27B source access point 245 and destination device 248 both transmit and receive on the same channel, i.e., channel "A" for source 245 and channel "B" for destination 248. Repeaters 246 & 247, on the other hand, are capable of changing their transmitting channel frequencies according to one embodiment of the present invention in order to minimize bandwidth loss.

As can be seen in the upstream transmission example of FIG. 27A, source 245 transmits a message to the receiver section of repeater 246 on channel "A", and the transmitter section of repeater 246 then sends that message to the receiver portion of repeater 247 on channel "B". Since destination device 248 is configured to receive transmission on channel "B", repeater 247 must also transmit the message on channel "B", with a resultant 50% loss of bandwidth due to the fact that repeater 247 transmits and receives on the same channel. Note, however, that this bandwidth loss is still an improvement over the 67% bandwidth loss characteristic of the prior art approach described above in a network with two repeaters.

For the upstream transmission example shown in FIG. 27B, repeaters 246 and 247 both change their transmitting frequencies from "B" to "A". As was the case with the downstream transmission, the upstream transmission incurs a 50% bandwidth loss due to the repeating of channel "A" in both the transmitter and receiver sections of repeater 246.

Figure 28A:
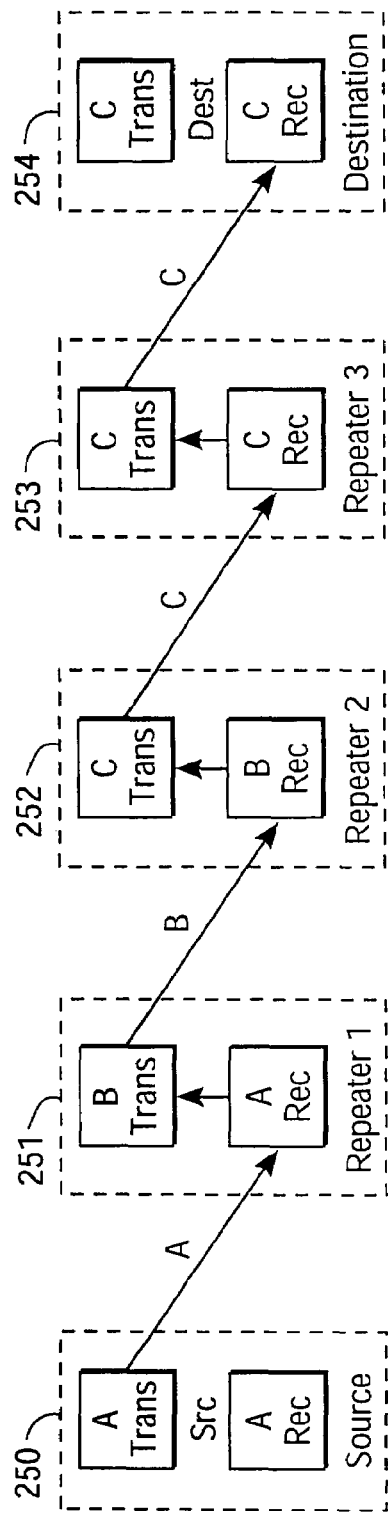
FIGS. 28A & 28B show examples of access point repeating in a network utilizing three repeaters in accordance with another embodiment of the present invention.
Figure 28B:
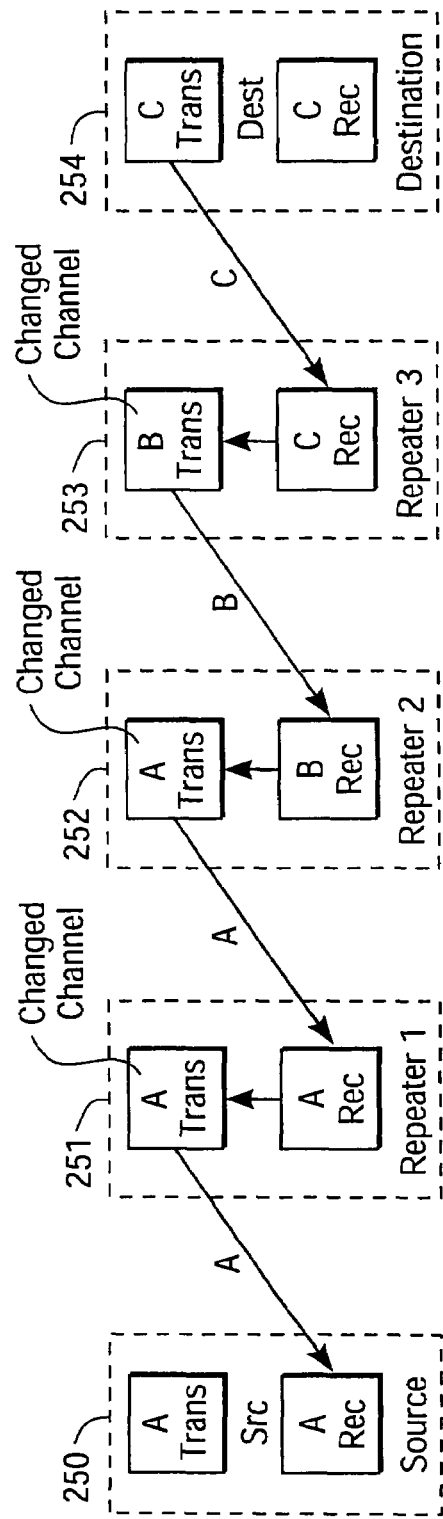

FIGS. 28A & 28B show the same concept of access point repeating extended to three repeaters in the transmission link or network chain, according to another embodiment of the present invention. As was the case in FIGS. 27A & 27B, each of the repeaters 251-253 is capable of changing its transmitting frequency. The receiving frequencies utilized by repeaters 251-253 remain steady. For instance, the receiver portions of repeaters 251-253 are shown configured to operate on channels "A", "B", and "C", respectively, for both the downstream and upstream transmissions of FIGS. 28A & 28B. Source access point 250 transmits/receives on channel "A" and destination device 254 transmits/receives on channel "C", regardless of the direction of transmission.

In accordance with the presently described embodiment of the invention, each of the repeaters 251-253 changes its transmitting frequency when switching the direction of transmission (i.e., from upstream to downstream, or vice-versa). For example, in the upstream transmission of FIG. 28B, the transmitter section of repeater 251 changes from "B" to "A"; the transmitter of repeater 252 changes from "C" to "A"; and the transmitter of repeater 253 changes from "C" to "B".

In this embodiment, the upstream transmission incurs a 50% bandwidth loss due to the repeating of channel "A" in both the transmitter and receiver sections of repeater 251. Likewise, the downstream transmission incurs a 50% bandwidth loss due to the repeating of channel "C" in repeater 253. Even though each transmission incurs a 50% bandwidth loss, this is significantly less than the 75% bandwidth loss suffered by the prior art approach described above with three repeaters. In other words, whereas the prior art approach of FIGS. 26A & 26B incurs increased bandwidth loss with additional repeaters, the single transceiver with changing transmitter frequencies approach described in conjunction with FIGS. 27 & 28 only results in a 50% bandwidth loss regardless of the number of repeaters utilized in the wireless network.

An exemplary transaction across a wireless network utilizing non-access point repeaters that provide a transmission link between a source and a destination device in accordance with yet another embodiment of the present invention is shown in FIGS. 29A-29F. The transaction illustrated comprises a request-to-send (RTS) message sent from the source to the destination, followed by a clear-to-send (CTS) message sent in response from the destination back to the source. Once the CTS message is received, the source transmits data in packet form across the network. After receipt of the data packets, the destination issues an acknowledgement (ACK) message for transmission across the network to the source access point. This same basic transaction can operate in reverse; that is, the destination can initiate a transaction by sending an RTS prior to sending data upstream. In this latter case, the source sends CTS and ACK messages in response at the appropriate times.

FIG. 29A shows a wireless network according to one embodiment of the present invention in an idle state awaiting a potential RTS issued from either source access point 256 or destination device 259. In the idle state, repeaters 257 and 258 have their receivers set to the same frequencies that source 256 and destination 259 are expected to transmit on. In this case, since source 256 is set to transmit (and receive) on channel "A", the receiver of repeater 257 is also set to operate on channel "A". Similarly, because destination device is set to transmit (and receive) on channel "C", the receiver of repeater 258 is set to operate on channel "C". To keep their associated transmission links active when the wireless network is idle, repeaters 257 and 258 may periodically send simple "ping" messages to each other (or to other neighboring repeaters in a larger network) on the appropriate channel. In this example, since the receiver sections of repeaters 257 and 258 are set to channels "A" and "C", respectively, the transmitter sections of repeaters 257 and 258 are respectively set to channels "C" and "A" in the idle state.

It should be understood that in the particular embodiment of FIGS. 29A-29F, repeaters 257 and 258 are non-access point repeaters. That is, repeaters 257 and 258 are intended to function solely as repeaters in the wireless network, analogous to links in a communication chain extending from the source to the destination. To put it another way, repeaters 257 and 258 only serve the purpose of carrying transmissions from source 256 to destination 259, and vice-versa. Because repeaters 257 and 258 do not serve as access points to intermediately located destination devices, their receivers are not restricted to fixed frequency channels. In other words, according to the embodiment of FIGS. 29A-29F both the receiver and the transmitter sections of repeaters 257 & 258 may change frequency channels to maximize bandwidth of data transmissions, as described in more detail below.

FIG. 29B illustrates the transmission of a RTS message sent from source 256 to destination 259. The RTS message is transmitted by source 256 on channel "A" and received by repeater 257 on the same frequency channel. Repeater 257 then transmits the RTS message to repeater 258 on channel "C". Since destination 259 is configured to receive on channel "C", the transmitter section of repeater 258 changes from "A" to "C" in order to complete the transmission of the RTS message across the wireless network. Note that a 50% bandwidth loss occurs during the RTS transmission due to channel "C" being utilized by both the receiver and transmitter sections of repeater 258. Practitioners familiar with network communications, however, will understand that because a RTS transmission is a very brief transmission, this loss of bandwidth has virtually no affect on the overall bandwidth of the system.

Figure 29C:
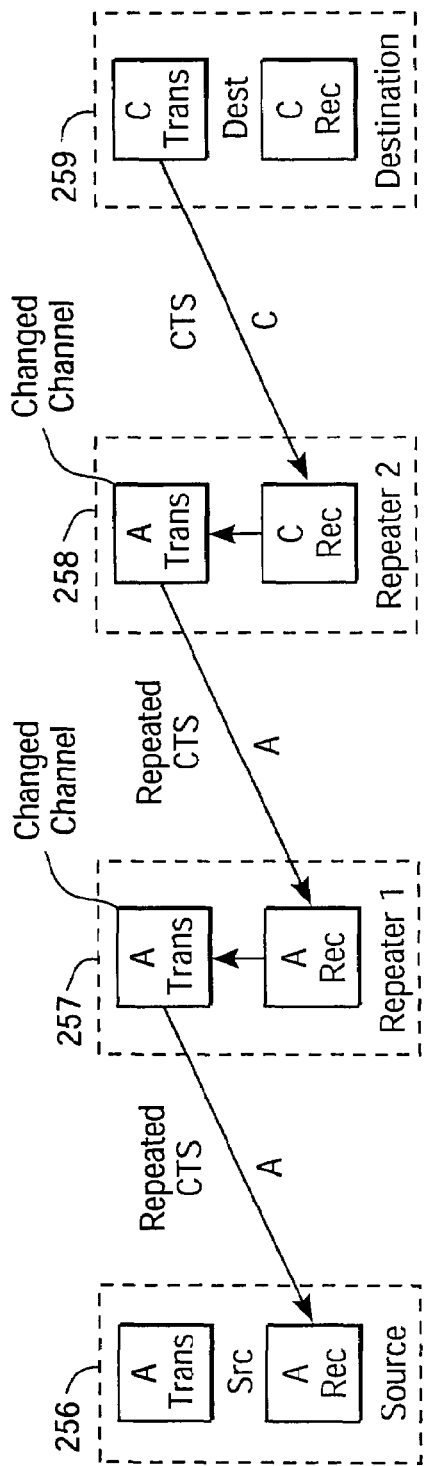

The next stage in the transaction occurs when destination device 259 sends a CTS transmission back to source 256, as shown in FIG. 29C. In this case, the transmitter sections of repeaters 257 and 258 both change from frequency channel "C" to channel "A". As was the case with the RTS message, the CTS transmission incurs a 50% loss of bandwidth due to the repeated use of frequency channel "A" by repeater 257. However, because the CTS transmission is very brief the overall bandwidth of the system is virtually unaffected.

Figure 29D:
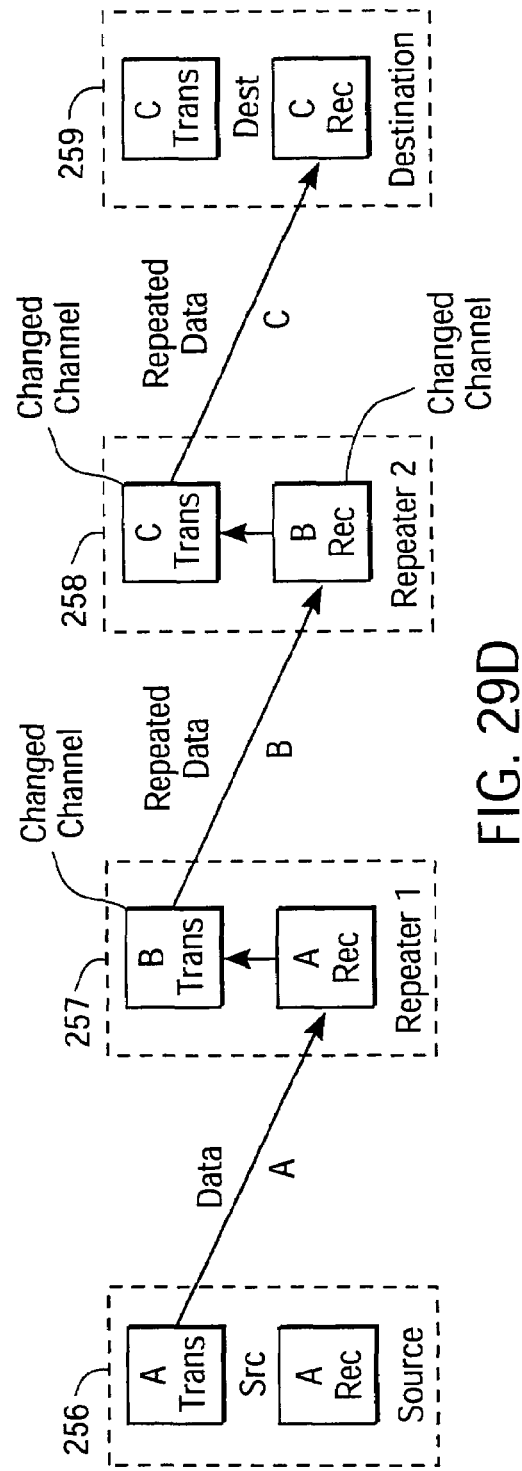

Once the CTS message is received by source 256, source 256 sends the data (e.g., high bandwidth video data) to destination device 259 across the wireless network. Data transmission from source 256 to destination 259 is shown occurring in FIG. 29D. During data transmission, both the transmitter and receiver sections of repeaters 257 and 258 are operable to change frequencies so that there is no effective bandwidth loss in the data transmission between source 256 and destination device 259. In the example of FIG. 29D, the transmitter of repeater 258 changes from frequency channel "A" to frequency channel "C" so that destination device 259 can receive the data being sent. To prevent loss of bandwidth, the receiver section of repeater 258 changes frequency from channel "C" to "B". The transmitter section of repeater 257, in turn, changes from frequency channel "A" to "B". Thus, by utilizing non-access point repeaters with transmitter and receiver sections configured to change frequency and operate simultaneously, the embodiment of FIG. 29 achieves data transmission (upstream or downstream) with no bandwidth loss.

After the last data packet is received, destination device 259 sends an acknowledgement (ACK) message back to source 256 on channel "C", as shown in FIG. 29E. Here again, the transmitter and receiver section of repeater 258 change frequency channels to accommodate transmission of the ACK message. As shown in the example of FIG. 29E, the receiver section of repeater 258 changes to channel "C" and the transmitter section changes to channel "A". Only the transmitter section of repeater 257 is shown changing frequency channels (from "B" to "A") so that the repeated ACK message can be received by source 256. As was the case with the RTS and CTS messages, the loss of bandwidth from repeater 257 transmitting and receiving on the same channel is insignificant since the ACK message is very brief.

Practitioners will appreciate that it is also possible to configure the receivers of each of the repeaters to also change frequency during the RTS, CTS, and ACK message transmissions in order to eliminate bandwidth loss. But again, because each of these transmissions is very brief in duration, the advantage of such implementations is minimal.

FIG. 29F shows the wireless network returning to the idle state once the ACK message is received by source 256. To maintain its link with repeater 258 during the idle period, the transmitter of repeater 257 is shown changing its operating frequency from channel "A" to channel "C".

Another way to achieve high bandwidth operation in a wireless network is shown in the embodiment of FIGS. 30A-30F, which illustrates a transaction from a source access point 261 to a destination device 264 which includes the transmission of high bandwidth data packets, e.g., comprising high bandwidth video signals. Destination device 264 may comprise a wireless receiver unit, such as that shown in FIG. 25, which receives video data and outputs a video display image to a television. In the embodiment of FIGS. 30A-30F, destination device 264 comprises a wireless receiver unit that includes separate transmitter and receiver sections that operate on different frequency channels.

In the example of FIGS. 30A-30F, repeaters 262 and 263 function both as repeaters and access points. Thus, repeaters 262 and 263 are shown with their receivers set to a fixed frequency channel. In each of FIGS. 30A-30F, for example, the receiver of repeater 262 is set to operate on channel "A" and the receiver of repeater 263 is set to operate on channel "B". Nonetheless, because destination device 264 transmits and receives on different channels the embodiment of FIGS. 30A-30F achieves downstream data transmission without bandwidth loss.

Figure 30A:
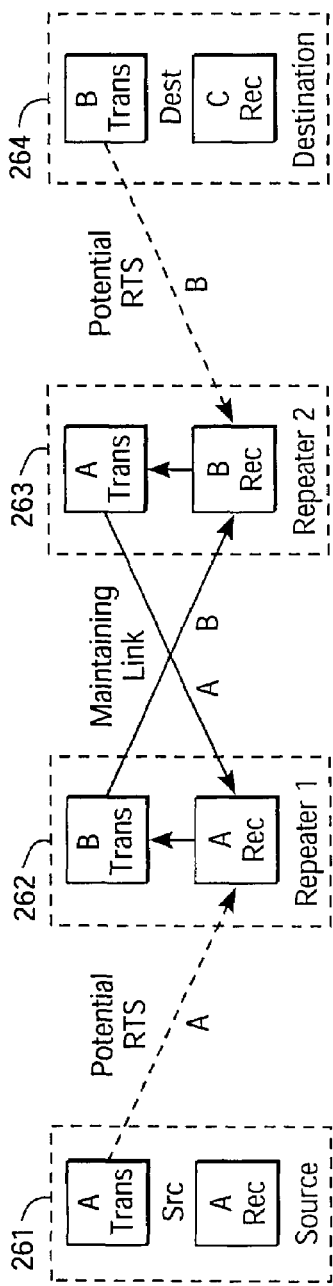

FIG. 30A illustrates the wireless network in an idle state much the same as that shown in FIG. 29A. Source access point 261 is configured to transmit and receive on frequency channel "A"; therefore, repeater 262 is set to receive a potential RTS transmission from source 261 on channel "A". Similarly, because destination device 264 transmits on channel "B", repeater 263 is set to receive a potential RTS transmission from destination 264 on channel "B". Repeaters 262 and 263 transmit on channels "B" and "A", respectively, to maintain active transmission links in the network.

Figure 30B:
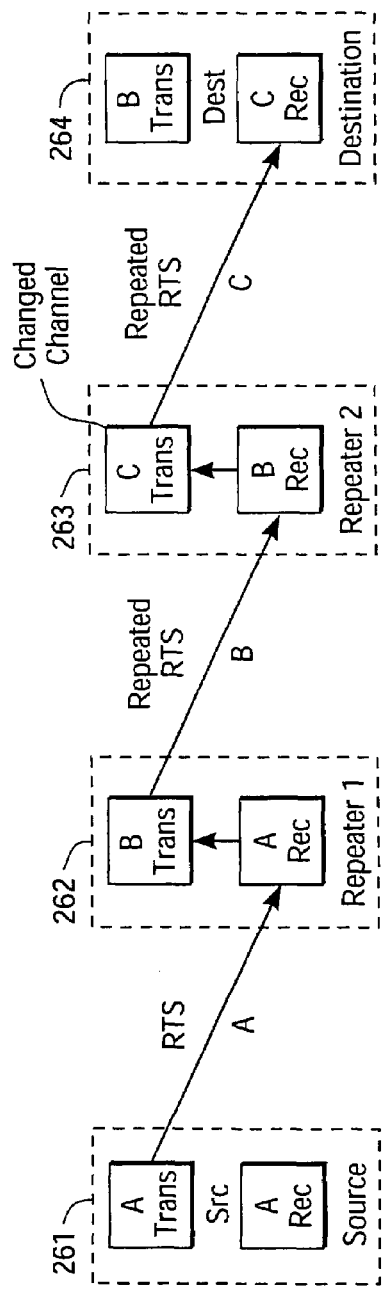

FIG. 30B shows an exemplary RTS message sent downstream from source 261 to destination 264. In this example, the transmitter of repeater 263 changes frequency from channel "A" to channel "C" in order to propagate the RTS message through the network chain to reach destination device 264. In response, destination device 264 sends back a CTS message to source 261, as shown in FIG. 30C. To propagate the CTS message, the transmitters of repeaters 262 and 263 both change frequency to channel "A". Note that the repeated use of channel "A" by repeater 262 results in a 50% bandwidth loss for this very brief transmission.

Downstream data transmission is shown in FIG. 30D with no bandwidth loss. In this case, both repeaters change their transmit frequencies (repeater 262 changes to channel "B" and repeater 263 changes to channel "C") but maintain their receive frequencies steady so they can function as access points as well as repeaters. This is made possible by destination device 264 having the capability of transmitting and receiving on different frequency channels and each of the repeaters having their receivers set to different channels, with only their transmitters changing frequency.

Figure 30E:
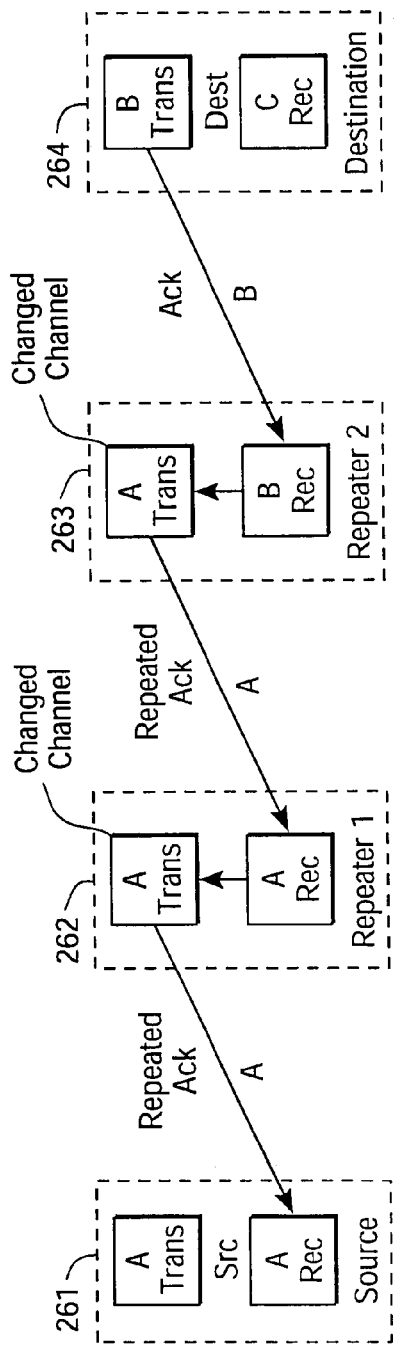
Figure 30F:
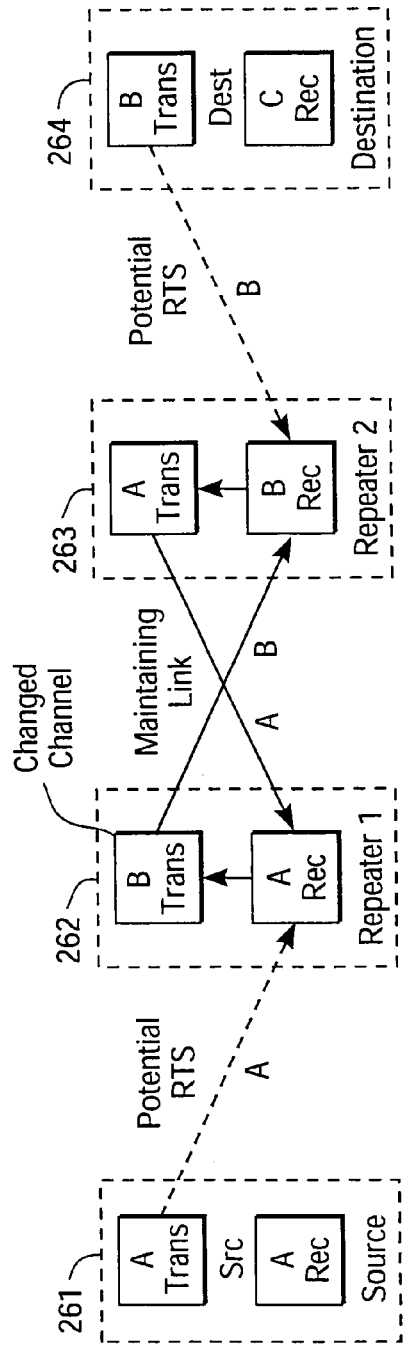

FIG. 30E shows an ACK transmission from destination device 264 to source 261, with repeaters 262 and 263 changing their transmit frequencies to the same channels (both channel "A") previously used to send the CTS message back across the network (see FIG. 30C). FIG. 30F illustrates the network returning to an idle state following completion of the video data transaction. To return to the idle state following an ACK transmission, the transmitter of repeater 262 changes frequency from channel "A" to channel "B".

Practitioners in the arts will understand that, unlike repeaters 262 and 263, the two different frequency channels of destination device 264 are not utilized simultaneously. In other words, destination device 264 transmits and receives at separate times. This allows for greater cost reduction. It is further appreciated that destination device 264 could utilize a conventional transceiver capable of shifting its frequency (e.g., run on frequency channel "B" during the transmission part of the transaction, and on frequency channel "C" during the reception part of the transaction).

It is also possible to achieve upstream transmissions according to the present invention without bandwidth loss by modifying the embodiment of FIG. 30 to include a source access point that transmits and receives on different frequency channels. In still another embodiment, as long as repeating occurs at different frequencies in the network chain all transmission can occur in the analog domain. In such an implementation, the carrier frequency of the analog transmission is simply shifted by each repeater utilizing any one of a number of well-known frequency shifting techniques. This approach obviates the need for digital signal conversions thereby providing certain cost benefits.

Figure 31:
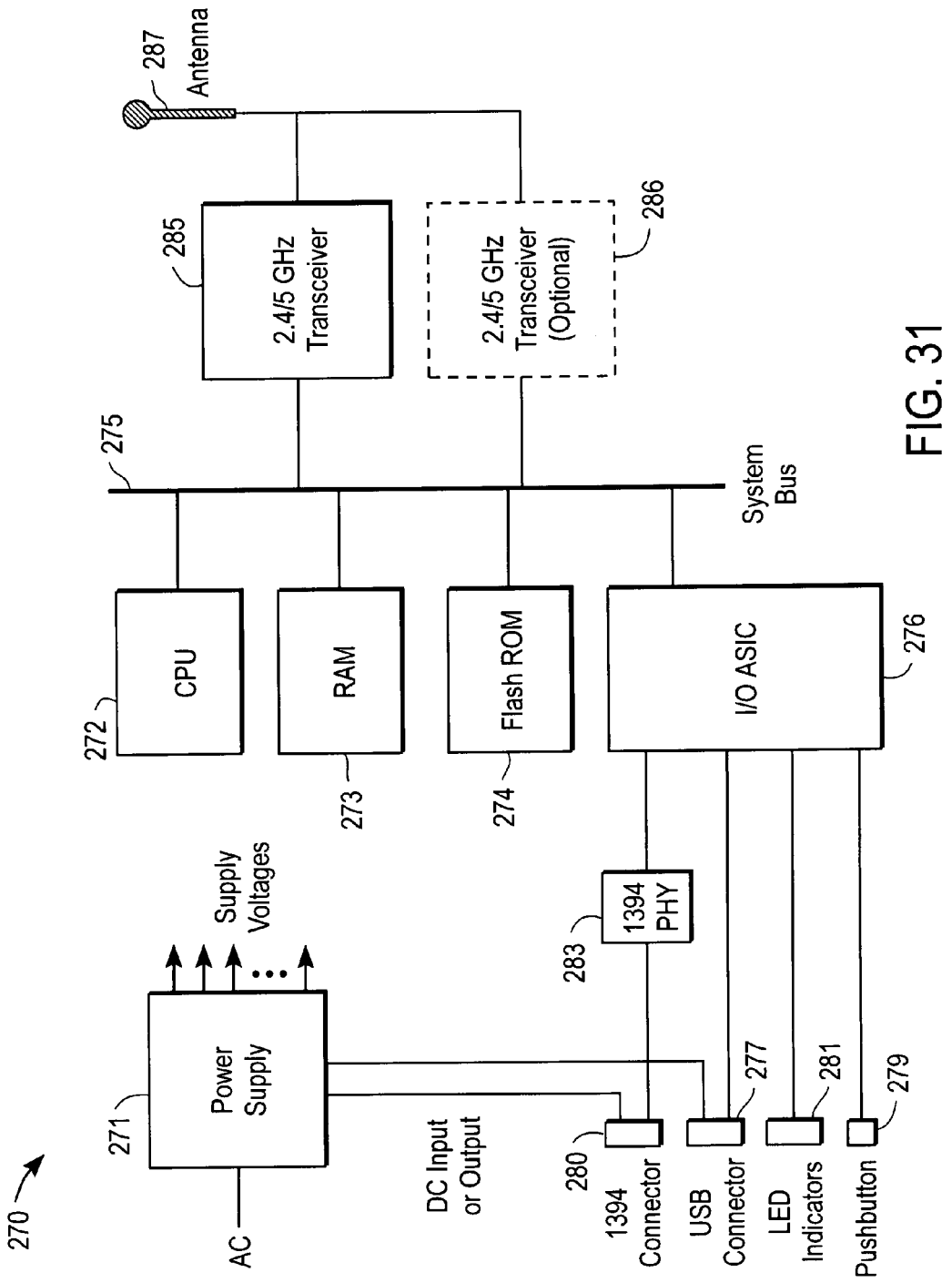
FIG. 31 is an architectural block diagram of a wireless repeater according to yet another embodiment of the present invention.

FIG. 31 is a circuit block diagram of the internal architecture of repeater unit 270 according to still another embodiment of the present invention. In many respects, repeater 270 is similar to repeater of FIG. 24. For example, repeater 270 includes a transformer/power supply 271 to provide supply voltages to the various internal electronic components, which include a CPU 272, a RAM 273, a Flash ROM 274, and I/O ASIC 276, each of which is shown coupled to a system bus 275. USB and 1394 connectors 277 and 280 are configured with supply pins coupled to power supply 271 as previously described. Repeater 270 also includes LED indicator panel 281 and pushbutton switch 279 to assist in the installation and connection of repeater 270 to the wireless network.

The embodiment of FIG. 31 differs from the earlier embodiments in that it utilizes a single transceiver 285 that is capable of operating in accordance with IEEE 802.11a, 802.11b, and the 802.11g standards in both the 2.4 GHz and 5 GHz bands. For example, in one implementation, transceiver 285 may comprise the AR5001X transceiver chipset manufactured by Atheros, Inc., of Sunnyvale, Calif. In other embodiments, transceiver 285 may comprise a single 2.4 GHz or 5 GHz band transceiver. An additional transceiver 2.4/5 GHz transceiver 286 may optionally be included in order to configure repeater unit 270 to function as an access point as well as a repeater. When repeater unit 270 is configured as an access point, transceiver 286 may operate to receive requests from nearby client devices, as well as transmit data to those devices.

As can be seen, transceiver 285 and optional transceiver 286 are both coupled to system bus 275. Both transceivers are also shown coupled to an antenna 287. Alternatively, transceivers 285 and 286 may each be coupled to separate antennas.

Figure 32B:
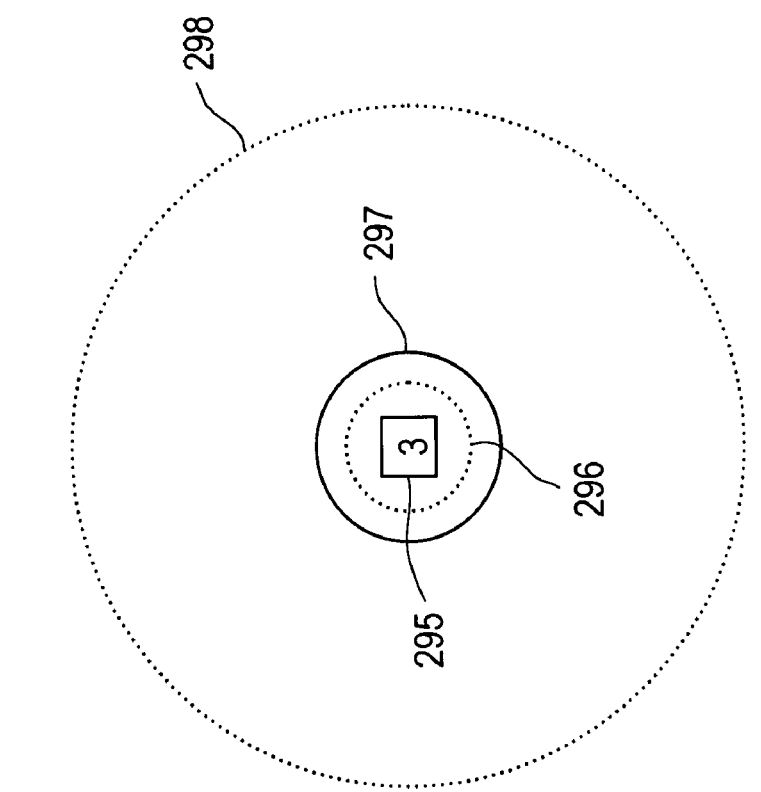
FIGS. 32A & 32B is another illustration showing propagation characteristics for access points operating in the 2.4 GHz and 5 GHz frequency bands.
Figure 32A:
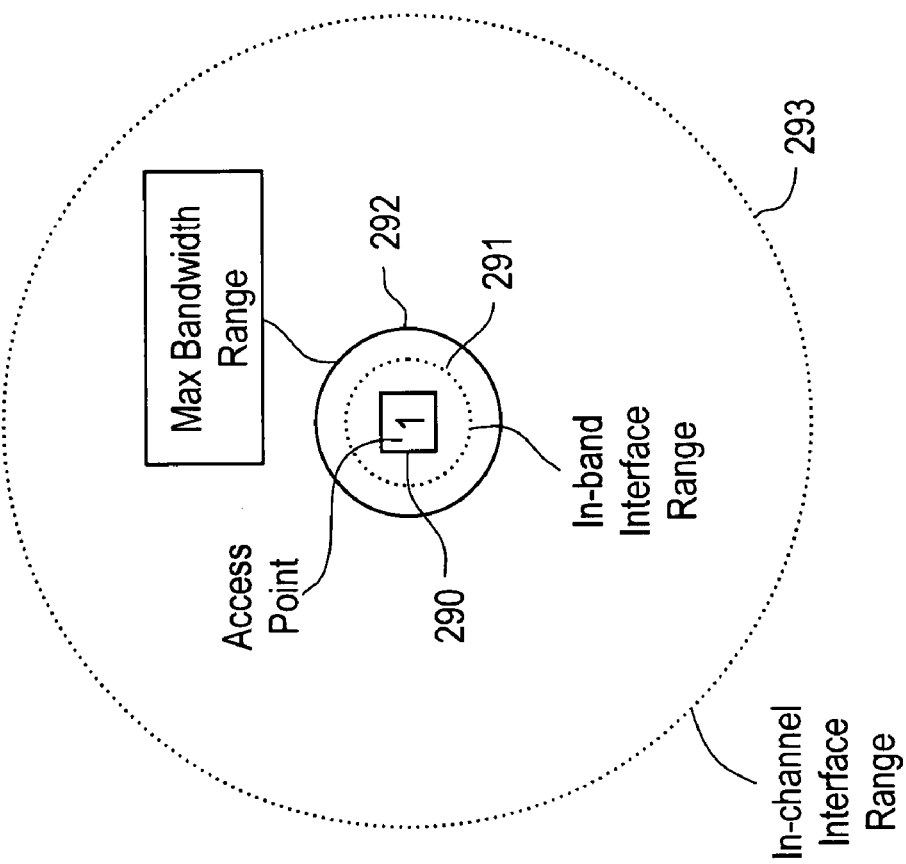

FIG. 32A is a diagram illustrating the two-dimensional propagation characteristics through open air associated with a repeater or access point 290 operating in the 2.4 GHz band and transmitting on channel 1. Inner dashed circle 291 represents the in-band interference range, which is the range where the access point or repeater interferes with other wireless devices operating in the same frequency band, but not necessarily on the same frequency channel. That is, if another wireless device is located within the in-band interference range of circle 291, then transmissions by access point 290 (e.g., on channel 1) will interfere with the other wireless device's ability to receive data on any channel within the transmission frequency band. Although the in-band interference range varies depending on such factors as transmit power, level of isolation between channels, etc., a typical range of circle 291 is about 2-3 feet.

The maximum bandwidth range is shown in FIG. 32A by solid circle 292. Outside of this range the signal begins to lose bandwidth due to various impediments to signal transmission. By way of example, 2.4 GHz transceivers operating in accordance with the 802.11g standard have a maximum bandwidth range of approximately 50 feet. Outer dashed circle 293 represents the range at which the signal from access point 20 ceases to interfere with other signals in the same channel. These signal characteristics were discussed earlier in conjunction with FIGS. 2A & 2B. FIG. 32B shows an access point 295 operating in the 5 GHz band with in-band interference, maximum bandwidth, and in-channel interference ranges represented by circles 296-298, respectively. Practitioners in the art will understand that transmissions in the 5 GHz band have somewhat shorter in-band and in-channel interference ranges.

FIG. 33A is an example of signal repeating for a wireless network utilizing the repeater architecture shown in FIG. 31. FIG. 33B is a chart illustrating pipelined data packet flow from source to destination for the example of FIG. 33A. Transmission of individual data packets across the network is indicated by a staircase line extending from the upper left of the diagram toward the lower right. As can be seen, source access point 300a transmits (Tx) a first data packet ($DP_1$) on frequency channel 1 during cycle time $t_0$, which packet is then received (Rx) on channel 1 by repeater 300b during the same cycle. Repeater 300b transmits $DP_1$ in cycle $t_1$ on frequency channel 6. Repeater 300c, in turn, receives $DP_1$ on channel 6 and re-transmits that data packet on channel 11 during transmission cycle $t_1$.

In accordance with the pipelined data transmission of the present invention, source 300a transmits $DP_2$ in cycle $t_2$ on channel 1. At the same time, repeater 300c transmits $DP_1$ on channel 11, which is then received by destination device 305 in the same cycle. This is made possible by the fact that each repeater is located beyond the in-band interference range, yet within the range of maximum bandwidth, of nearby, i.e., adjacently-located, repeaters (as well as the source and destination devices) in the transmission chain. For instance repeater 300b is located outside the in-band interference range of source 300a; repeater 300c is located outside the in-band interference range of repeater 300b; and destination device 305 is placed outside of the in-band interference range of repeater 300c.

Note that in the example of FIGS. 33A and 33B source device transmits another data packet every other packet cycle, for a 50% bandwidth loss. This bandwidth loss, however, remains the same regardless of the number of repeaters utilized in the wireless network. The reason why is because the network is configured such that two repeaters (or the source device and a repeater) that transmit simultaneously are physically located outside of each other's in-band interference range. By way of example, in FIG. 1 source 300a and repeater 300c are located far enough away from one another that they do not interfere.

Figures 34A, 34B:
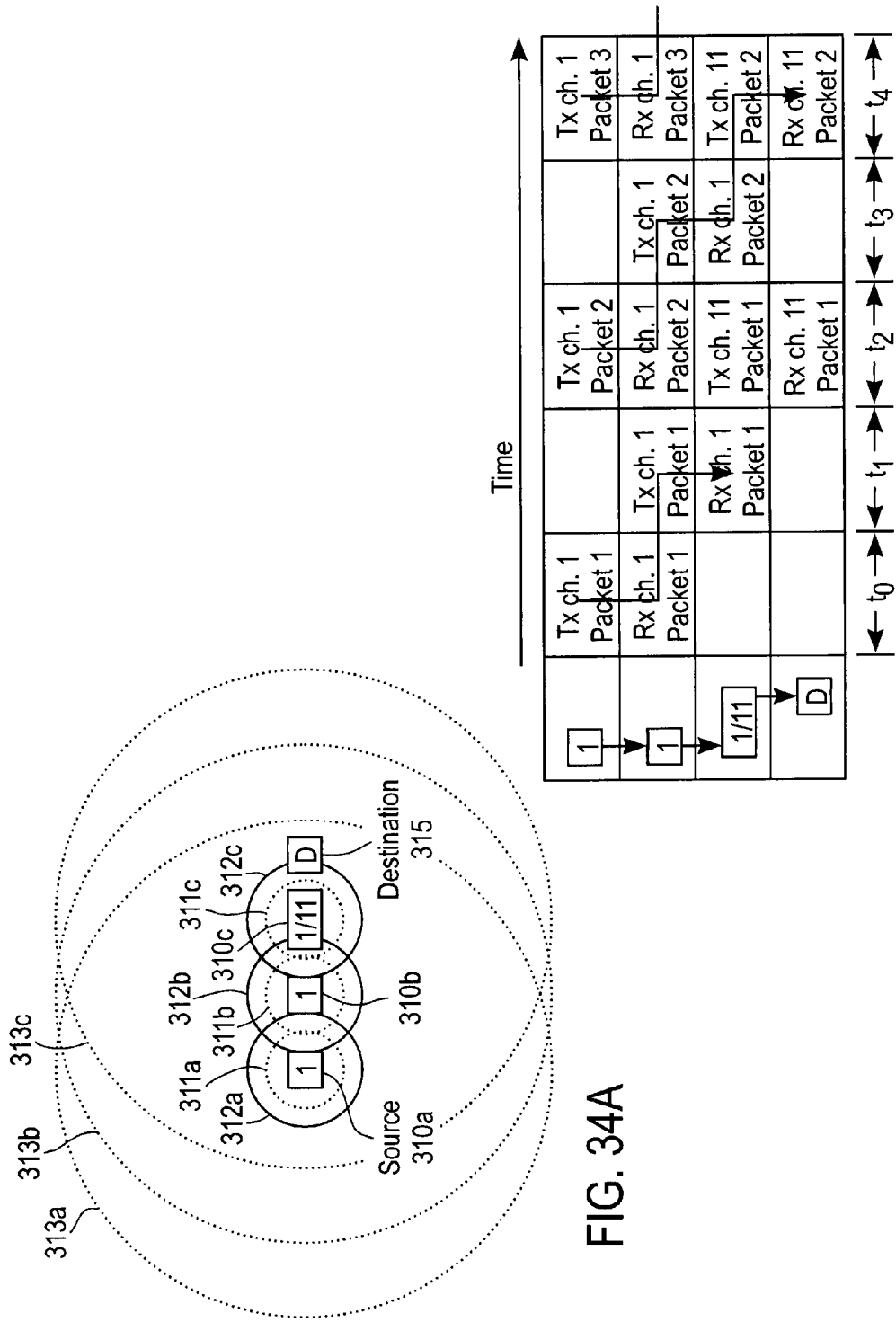
FIG. 34A is an example of wireless signal repeating in accordance with still another embodiment of the present invention.
FIG. 34B is a chart illustrating pipelined data packet flow from source to destination in accordance with the embodiment of FIG. 34A.

A variation of the example of FIGS. 33A & 33B is provided in FIGS. 34A & 34B, which shows repeater 310b (the first repeater in the chain) reusing the same channel (e.g., channel 1) for both receiving and transmitting; that is, repeater 310b receives $DP_1$ on channel 1 in cycle $_0$ and transmits $DP_1$ on channel 1 in cycle $t_1$. The reason why repeater 310b is permitted to transmit/receive on the same channel is because source device 310a does not transmit during cycle $t_1$. In this example, repeater 310c receives $DP_1$ on channel 1 in cycle $t_1$ and transmits $DP_1$ on channel 11 to destination device 315 in cycle $t_2$. If there were any additional repeaters in the transmission change, they would also receive/transmit on different channels. The implementation shown in FIGS. 34A & 34B has a maximum bandwidth loss of 50% regardless of the number of repeaters utilized, but advantageously reduces channel usage and switching overhead.

Figures 35A, 35B:
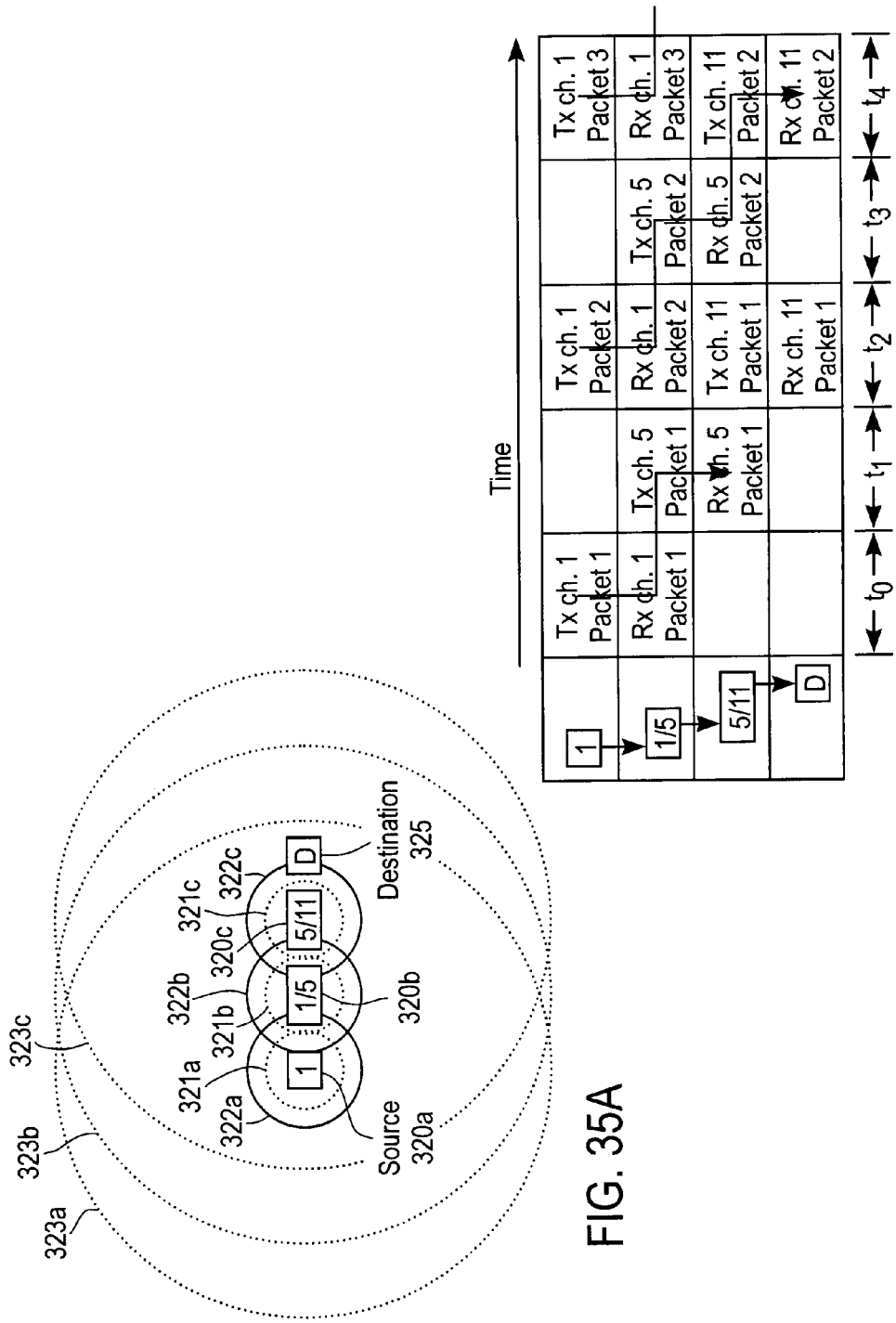
FIG. 35A is an example of wireless signal repeating in accordance with yet another embodiment of the present invention.
FIG. 35B is a chart illustrating pipelined data packet flow from source to destination in accordance with the embodiment of FIG. 35A.

The embodiment of FIGS. 35A & 35B utilizes the dual frequency band capabilities of the single transceiver repeater architecture shown in FIG. 31. In the configuration shown, source device 320a and destination device 325 both operate exclusively in the 2.4 GHz frequency band, e.g., of the 802.11b and 802.11g protocols. Source 320a, for example, transmits $DP_1$ in the 2.4 GHz band on channel 1 in cycle $t_0$, which is received on the same channel and in the same cycle by repeater 320b. Repeater 320b, however, changes frequency bands as well as changing channels to transmit $DP_1$. That is to say, repeater 320b switches to the 5 GHz frequency band (802.11a) to re-transmit $DP_1$ on channel 5 in cycle $t_1$, which, in turn, is received by repeater 320c on channel 5 in cycle $t_1$. In cycle $t_3$ repeater 320c changes back to the 2.4 GHz band to transmit $DP_1$ on channel 11 to destination device 325.

In the embodiment of FIGS. 35A & 35B the 5 GHz band is utilized for repeater-to-repeater signal transmission, with data transmission between source & repeater devices and repeater & destination devices taking place in the 2.4 GHz band. One advantage of utilizing the 5 GHz band for repeating is that it is basically possible to implement a wireless network with as many repeaters as needed due to the much greater number of channels available in the 5 GHz band. Additionally, the maximum bandwidth loss for the wireless network of FIGS. 35A & 35B is still limited to 50% regardless of the number of repeaters utilized in the transmission chain.

Figure 36A:
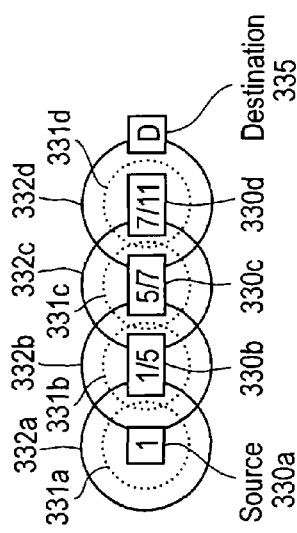
FIG. 36A is an example of wireless signal repeating in accordance with a further embodiment of the present invention.
Figure 36B:
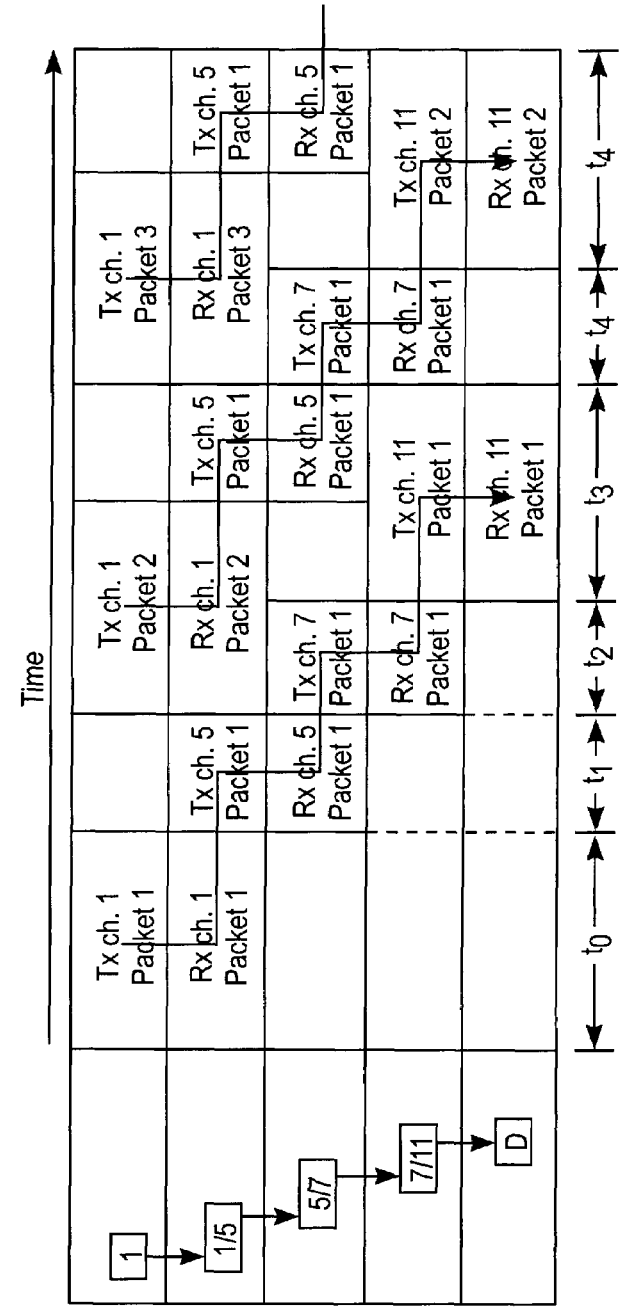
FIG. 36B is a chart illustrating pipelined data packet flow from source to destination in accordance with the embodiment of FIG. 36A.

FIGS. 36A & 36B illustrate a wireless network utilizing repeaters according to the architecture of FIG. 31, each having a single transceiver that operates in the 5 GHz band in a so-called "turbo" mode in which transmissions take place on two different channels simultaneously. Transceivers that operate in the 5 GHz frequency band in turbo mode are commercially-available from Atheros, Inc., of Sunnyvale, Calif. As will become apparent from the discussion below, bandwidth loss in this embodiment is limited to 33% no matter how many repeaters are utilized.

FIG. 36A shows a wireless network comprising a source device 330a, repeaters 330b-330d, and destination device 335. (Note that only the in-band interference and maximum bandwidth ranges 331 and 332, respectively, are only shown. The in-channel interference range is omitted to simplify the figure.) FIG. 36B shows source 330a transmitting data packet $DP_1$ on channel 1 in cycle $t_0$. Repeater 300b receives $DP_1$ on channel 1 in the 2.4 GHz band in cycle $t_0$. In cycle $t_1$, repeater 300b transmits $DP_1$ to repeater 300c in 5 GHz turbo mode utilizing channels 5 & 6 (only the lowest channel number is shown in FIGS. 36A & 36B for clarity). Due to the fact that $DP_1$ is simultaneously transmitted on two different channels, the duration of cycle $t_1$ is only half as long as cycle $t_0$. Repeater 330c, which is also configured to transmit in turbo mode in this embodiment, receives $DP_1$ on channels 5 & 6 in the 5 GHz band in cycle $t_1$ and re-transmits that same data packet on channels 7 & 8 in cycle $t_2$.

Finally, repeater 300d receives $DP_1$ on channels 7 & 8 in cycle $t_2$ and then sends $DP_1$ to destination device 325 in the 2.4 GHz band on channel 11 in cycle $t_3$. The transmission of data packets $DP_2$, $DP_3$, and so on, continues in the same pipelined manner described above. That is, source 330a transmits the second data packet during cycle $t_2$ and the first half of cycle $t_3$ as shown in FIG. 36B. That packet is received by repeater 300b and re-transmitted on channels 5 & 6 in turbo mode in the second half of cycle $t_2$, and so on.

Practitioners in the art will appreciate that because repeaters 300b and 300c are running at twice the normal data rate, they only need half the time normally needed to transmit in the 2.4 GHz band. This time savings limits the bandwidth loss in the embodiment of FIGS. 36A & 36B to 33% regardless of the number of repeaters used in the transmission chain from source to destination. Again, because each of the communications devices in FIGS. 36A & 36B are located beyond each device's in-band range 331, no interference occurs during transmissions. It should also be understood that any of the repeaters 300b-300d could also be configured to function as an access point through the inclusion of optional transceiver 286, although some sort of isolation circuitry may be needed in such a design since the two transceivers 285 and 286 might operate simultaneously within the in-band interference range.

Figures 37A, 37B:
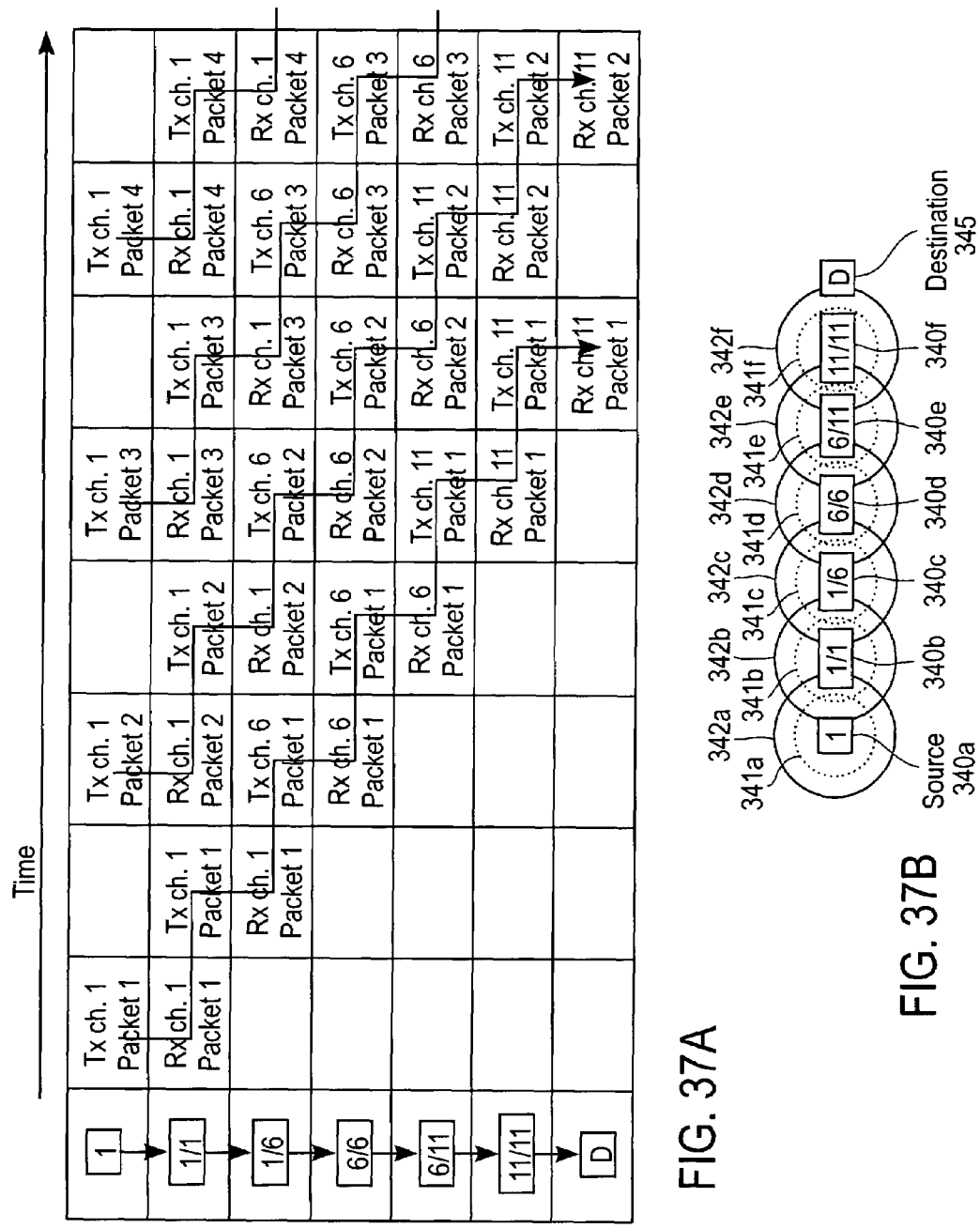
FIG. 37A is an example of wireless signal repeating in accordance with another embodiment of the present invention.
FIG. 37B is a chart illustrating pipelined data packet flow from source to destination in accordance with the embodiment of FIG. 37A.

FIGS. 37A & 37B show another embodiment of a wireless network according to the present invention in which every other repeater in the transmission chain from source device 340a to destination device 345 re-uses the same frequency channel. In other words, the same channel is reused every second repeater. In this channel doubling configuration repeaters 340b, 340d, and 340f all transmit and receive data packets on the same frequency channel. Alternate intervening repeaters 340c and 340e receive and transmit on different channels; that is, repeaters 340c and 340e switch channels (from Rx to Tx) during repeating.

As before, each repeater 340b-340f is located outside of the in-band interference range 341 of other neighboring repeaters, as well as that of the source device 340a. Destination device 345 is also located beyond the in-band interference range 341 of repeater 340f. At the same time, each repeater (and the source and destination devices) is located within its neighboring device's maximum bandwidth range 342. By way of example, repeater 340b is located within the maximum bandwidth ranges 342a & 342c, and outside of the in-band interference ranges 341a & 341c, of source device 340a and repeater 340c, respectively.

At any given moment, only one device in the wireless network of FIG. 37B transmits on the same channel. Thus, the embodiment of FIGS. 37A & 37B not only uses channels very efficiently, it also makes it possible to extend the wireless network of the present invention over a greater distance. In other words, given the limited number of available channels in a frequency band (e.g., the 2.4 GHz band only has three available channels) the wireless network of FIGS. 37A & 37B can extend a farther distance than the previous embodiments that do not employ channel doubling from source to destination. Additionally, in the wireless network of FIG. 37B the bandwidth loss is limited to 50% regardless of the number of repeaters utilized in the transmission chain. In the event that there is a delay for transceivers to switch channels, the channel doubling embodiment of FIG. 37B also reduces channel-switching latency by 50% as compared to channel switching on every repeater.

It should be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

The invention claimed is:

1. A system comprising:
a source device operable to alternate between transmitting and not transmitting data for a plurality of successive time intervals that includes first, second and third time intervals, the source device transmitting on a first frequency during odd-numbered time intervals and not transmitting during even-numbered time intervals, a first block of data being transmitted during the first time interval, the source device ceasing transmission during the second time interval, and transmitting a second block of data during the third time interval;
a destination device; and
a plurality of wireless repeaters arranged to provide a pipelined data transmission link between the source device and the destination device, each of the repeaters having a transceiver coupled with a non-directional antenna, a first wireless repeater being operable to receive the first block of data from the source device during the first time interval, store the first block of data in a memory, and then transmit the first block of data within the second time interval, a second repeater within an in-band interference range of the source device being operable to receive the first block of date from the first wireless repeater during the second time interval, store the first block of data, and then transmit the first block of data within the third time interval on a second frequency that is non-interfering with respect to the first frequency,
wherein the first repeater receives and stores data in the memory during the odd-numbered time intervals, and transmits the stored data within the even-numbered time intervals.

2. The system of claim 1 wherein the second repeater receives and stores the data during the even-numbered time intervals and transmits the data using the second frequency during the odd-numbered time intervals.

3. The system of claim 1 wherein the destination device receives the first block of data from a last repeater in the pipelined data transmission link.

4. The system of claim 1 wherein the second frequency is in a 5 GHz frequency band.

5. A system comprising:
a source device that transmits data packets;
a destination device that receives the data packets;
a plurality of wireless repeaters configured to provide a pipelined data transmission link between the source device and the destination device in accordance with a transmission protocol, at least two of the wireless repeaters in the pipelined data transmission link being located within an in-band interference range of each other, each of the wireless repeaters having only a single transceiver coupled with a non-directional antenna, in accordance with the transmission protocol data throughput being maintained in the pipelined data transmission link as additional ones of the wireless repeaters are inserted in the network chain;
wherein the source device is operable to alternate between transmitting and not transmitting data packets for a plurality of successive time intervals, the source device transmitting during odd-numbered time intervals and not transmitting during even-numbered time intervals;
and wherein the destination device is located beyond an in-band interference range, yet within a maximum bandwidth range, of a last repeater in the network chain.

6. The system of claim 5 wherein at least one of the wireless repeaters transmits in a 5 GHz frequency band.

7. The system of claim 5 wherein each of the wireless repeaters transmits and receives in a 2.4 GHz frequency band.

8. The system of claim 5 wherein a first repeater in the pipelined data transmission link receives data from the source device in a 2.4 GHz frequency band and transmits in a 5 GHz frequency band, and a last repeater in the transmission link receives data in the 5 GHz frequency band and transmits to the destination device in the 2.4 GHz frequency band.

9. A system comprising:
a source device operable to alternate between transmitting and not transmitting data for a plurality of successive time intervals, the source device transmitting on a first frequency during odd-numbered time intervals and not transmitting during even-numbered time intervals;
a destination device; and
a plurality of wireless repeaters arranged to provide a pipelined data transmission link between the source device and the destination device, each of the wireless repeaters having a transceiver coupled with a non-directional antenna, a first wireless repeater being operable to receive data during the odd-numbered time intervals and transmit data within the even-numbered time intervals, a second wireless repeater located within an in-band interference range of the source device being operable to receive a first block of data from the first wireless repeater during a second time interval, store the first block of data, and then transmit the first block of data within a third time interval using a second frequency that is non-interfering with respect to the first frequency, one or more of the wireless computers being located in the pipelined data transmission link beyond an in-band interference range, yet within a maximum bandwidth range, of a next wireless repeater in the pipelined data transmission link, and further
wherein at least one of the wireless repeaters includes:
an input/output (I/O) unit to receive encryption key information that authenticates use in the pipelined data transmission link; and
a ROM to store the encryption key information.

10. The system of claim 9 wherein at least one of the wireless repeaters further comprises a connector coupled to the I/O unit, the connector for receiving a wire plug coupled to an external device that provides encryption key information.

11. The system of claim 9 wherein at least one of the wireless repeaters further comprises an indicator panel that provides a visual indication of transmission signal strength, the indicator panel being coupled to the I/O unit.

* * * * *